US010880206B2

United States Patent
Wei

(10) Patent No.: US 10,880,206 B2
(45) Date of Patent: Dec. 29, 2020

(54) MULTIPATH SELECTION SYSTEM AND METHOD FOR DATACENTER-CENTRIC METRO NETWORKS

(71) Applicant: Futurewei Technologies, Inc., Plano, TX (US)

(72) Inventor: Wei Wei, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/157,957

(22) Filed: Oct. 11, 2018

(65) Prior Publication Data

US 2019/0386913 A1 Dec. 19, 2019

Related U.S. Application Data

(60) Provisional application No. 62/684,457, filed on Jun. 13, 2018.

(51) Int. Cl.
*H04L 12/707* (2013.01)
*H04L 12/721* (2013.01)
(Continued)

(52) U.S. Cl.
CPC ............ *H04L 45/38* (2013.01); *G06F 16/152* (2019.01); *H04L 12/2852* (2013.01);
(Continued)

(58) Field of Classification Search
CPC ..... H04L 12/2852; H04L 45/24; H04L 45/38; H04L 45/7453; H04L 47/125; H04L 47/2441; H04L 47/30; H04L 49/1515
See application file for complete search history.

(56) References Cited

U.S. PATENT DOCUMENTS 7,644,157 B2 * 1/2010 Shomura ............... H04L 43/022
  709/224
7,664,048 B1 * 2/2010 Yung ....................... H04L 41/28
  370/235

(Continued)

FOREIGN PATENT DOCUMENTS

EP       3324586 A1    5/2018

OTHER PUBLICATIONS

"Data Networks and Open System Communications, Open Systems Interconnection—Model and Notation, Information Technology—Open Systems Interconnection—Basic Reference Model: The Basic Model," ITU-T Recommendation X.200, Jul. 1994, 63 pages.

(Continued)

*Primary Examiner* — Alpus Hsu
(74) *Attorney, Agent, or Firm* — Conley Rose, P.C.

(57) ABSTRACT

A network adapter for a metro network and a system including the network adapter for the metro network comprising a receiver configured to receive a data packet of a packet data flow at an ingress port; a memory comprising instructions; a processor coupled to the memory and the receiver, the instructions causing the processor to be configured to determine whether a hash value of the data packet matches a flow identifier (ID) in a flow table; and obtain a flow category of the data packet responsive to the hash value of the data packet matching the flow ID; and a transmitter coupled to the processor and configured to transmit the data packet to a spine switch of a plurality of spine switches using the flow category.

20 Claims, 10 Drawing Sheets

(51) Int. Cl.
*H04L 12/743* (2013.01)
*H04L 12/803* (2013.01)
*H04L 12/835* (2013.01)
*H04L 12/851* (2013.01)
*H04L 12/933* (2013.01)
*H04L 12/28* (2006.01)
*G06F 16/14* (2019.01)

(52) U.S. Cl.
CPC .......... *H04L 45/24* (2013.01); *H04L 45/7453* (2013.01); *H04L 47/125* (2013.01); *H04L 47/2441* (2013.01); *H04L 47/30* (2013.01); *H04L 49/1515* (2013.01)

(56) References Cited

U.S. PATENT DOCUMENTS

| | | | |
|---|---|---|---|
| 7,698,457 B2* | 4/2010 | Ghetie | H04L 47/10 709/238 |
| 7,974,288 B2* | 7/2011 | Romrell | H04L 12/4633 370/392 |
| 8,295,177 B1* | 10/2012 | Bharghavan | H04L 43/026 370/235 |
| 8,355,328 B2* | 1/2013 | Matthews | H04L 47/125 370/235 |
| 8,472,311 B2* | 6/2013 | Rodgers | G06F 15/16 370/217 |
| 8,537,674 B2* | 9/2013 | Brisebois | H04W 76/27 370/231 |
| 8,654,643 B2* | 2/2014 | Chew | H04L 43/12 370/235 |
| 8,861,351 B2* | 10/2014 | Brisebois | H04W 76/27 370/230 |
| 8,937,955 B2* | 1/2015 | Ramesh | H04L 45/748 370/389 |
| 8,976,647 B2* | 3/2015 | Song | H04L 47/34 370/229 |
| 9,083,740 B1* | 7/2015 | Ma | H04L 63/1408 |
| 9,167,618 B2* | 10/2015 | Brisebois | H04W 76/38 |
| 9,548,927 B2* | 1/2017 | Luke | H04L 45/22 |
| 9,608,938 B2* | 3/2017 | Venkatesan | H04L 49/25 |
| 9,641,436 B1 | 5/2017 | Stark et al. | |
| 9,654,424 B2* | 5/2017 | Pfaff | H04L 45/38 |
| 9,716,661 B2* | 7/2017 | Aybay | H04L 47/2441 |
| 9,755,927 B2* | 9/2017 | Li | G06Q 30/06 |
| 9,756,152 B1 | 9/2017 | Stark et al. | |
| 9,807,006 B1 | 10/2017 | Stark et al. | |
| 9,807,035 B1* | 10/2017 | Hanks | H04L 49/25 |
| 9,819,585 B1 | 11/2017 | Stark et al. | |
| 9,912,591 B1* | 3/2018 | Stark | H04L 45/745 |
| 9,998,374 B1* | 6/2018 | Stark | H04L 45/745 |
| 10,009,270 B1* | 6/2018 | Stark | H04L 45/745 |
| 10,033,638 B1* | 7/2018 | Stark | H04L 69/22 |
| 10,103,992 B1* | 10/2018 | Bshara | H04L 47/125 |
| 10,218,629 B1* | 2/2019 | An | H04L 47/283 |
| 10,237,171 B2* | 3/2019 | Gobriel | H04L 47/2441 |
| 10,257,082 B2* | 4/2019 | Hughes | H04L 69/22 |
| 10,291,503 B2* | 5/2019 | Gell | G06F 16/1844 |
| 10,348,600 B2* | 7/2019 | Perry | H04L 47/10 |
| 10,419,366 B1* | 9/2019 | Kim | H03M 13/096 |
| 2010/0192225 A1* | 7/2010 | Ma | G06F 21/552 726/23 |
| 2013/0003549 A1* | 1/2013 | Matthews | H04L 45/245 370/235 |
| 2015/0242429 A1* | 8/2015 | Varvello | H04L 45/7453 707/752 |
| 2015/0261887 A1* | 9/2015 | Joukov | G06F 16/9024 707/603 |
| 2016/0285753 A1* | 9/2016 | Guleria | H04L 45/38 |
| 2016/0301593 A1 | 10/2016 | Blair et al. | |
| 2017/0048148 A1* | 2/2017 | Huang | H04L 47/125 |
| 2019/0158415 A1* | 5/2019 | Pan | H04L 47/26 |

OTHER PUBLICATIONS

Foreign Communication From a Counterpart Application, PCT Application No. PCT/CN2019/090858, English Translation of International Search Report dated Aug. 27, 2019, 5 pages.
Foreign Communication From a Counterpart Application, PCT Application No. PCT/CN2019/090858, English Translation of Written Opinion dated Aug. 27, 2019, 4 pages.

* cited by examiner

MULTIPATH SELECTION SYSTEM AND METHOD FOR DATACENTER-CENTRIC METRO NETWORKS

CROSS-REFERENCE TO RELATED APPLICATIONS

This application claims priority to U.S. Provisional Patent Application 62/684,457, filed Jun. 13, 2018 by Liurong Qian, et. al., and entitled "Enhanced Equal Cost Multipath Hashing Algorithm For Multipath Selection in a Metrofabric Network," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A metropolitan network (hereinafter metro network) is a computer communication network that can cover an area from several miles to tens of miles, and may span across an entire city or a region (generally referred to as metro area). A combination of a network layer and a transport layer forms the metro network. Over 70 percent of commercial and business network traffic flows originate and terminate within the same metro area. Increasing demand for commercial and business services within the metro area has driven over-the-top service providers (OTTs), telecom service providers, and others to add infrastructure in order to support this increasing demand. For example, OTTs are continually adding POP edge servers in order to support content distribution, social media access and low latency services while telecom service providers are adding infrastructure to connect users to service providers and their services through unified metro networks for 5G, fixed access networks, IoT, data center interconnects, enterprise networks connections, or the like. OTT and other service providers may use different technologies within a metro area to provide services. For instance, a network layer or a transport layer may use a variety of protocols, public and private networks, networking devices, and multiplexing schemes, and the combination of protocols, control/management, and architecture evolution at the network and the transport layers can be expensive and complicated.

With more and more east-west M2M communication requirements, a metro network may be implemented with a datacenter network (DCN) architecture. In a DCN architecture, user computers connect to data centers and other user computers. A well-known topology of a DCN architecture for cloud computing may be a leaf and spine topology (also called a CLOS network after Charles Clos) that exploits multiple equal cost transmission paths in the network. In the CLOS network, each spine (or end of row) switch connects to each leaf switch, but each leaf switch does not directly connect to another leaf switch and each spine switch does not directly connect to another spine switch.

Using a CLOS network topology, a metro network for a city or a region has to carry a huge number of real-time/non-real-time, short-period/long-period flows dynamically and handle congestion or performance degradation in a cost-efficient way. However, as the number of applications and users in the metro network keeps growing, it may be difficult to maintain high-reliability and low-latency data flows while optimizing network utilization using a conventional DCN architecture.

SUMMARY

In one embodiment, the disclosure includes a network adapter for a metro network, comprising a receiver configured to receive a data packet of a packet data flow at an ingress port, a memory comprising instructions, a processor coupled to the memory and the receiver, the instructions causing the processor to be configured to determine whether a hash value of the data packet matches a flow identifier (ID) in a flow table, obtain a flow category of the data packet responsive to the hash value of the data packet matching the flow ID, and a transmitter coupled to the processor and configured to transmit the data packet to a spine switch of a plurality of spine switches using the flow category.

In yet another embodiment, the disclosure includes the processor configured to determine whether the packet data flow is active for a predetermined threshold time period, and the transmitter being configured to transmit additional data packets associated with the packet data flow to the spine switch responsive to the packet data flow being active for the predetermined threshold time period.

In yet another embodiment, the disclosure includes the processor configured to obtain at least one of a spine switch queue length or a spine switch link utilization between the network adapter and a second spine switch, and the transmitter being configured to transmit the data packet to the second spine switch responsive to the hash value of the data packet not matching the flow ID in the flow table.

In yet another embodiment, the disclosure includes the processor configured to determine a third spine switch according to a minimum of a queue length and link utilization of the third spine switch, and the transmitter being configured to transmit the data packet to the third spine switch responsive to the hash value of the data packet not matching the flow ID in the flow table;

In yet another embodiment, the disclosure includes a spine switch queue length with a queue delay in a buffer of the spine switch.

In yet another embodiment, the disclosure includes the processor configured to determine a weighted value of each network element for the at least one spine switch, and the transmitter being configured to transmit the data packet to the destination node using a higher weighted spine switch of the at least one spine switch.

In yet another embodiment, the disclosure includes the processor configured to assign the flow ID to the spine switch, the flow ID corresponding to the flow category of the data packet.

In another embodiment, the disclosure includes a method implemented in a metro network, comprising receiving, at a network adapter, a data packet of a packet data flow at an ingress port; determining, by the network adapter, whether a hash value of the data packet matches a flow identifier (ID) in a flow table; obtaining, by the network adapter, a flow category of the data packet responsive to the hash value of the data packet matching the flow ID; and transmitting, by the network adapter, the data packet to a spine switch of a plurality of spine switches using the flow category to permit the spine switch to route the data packet to a destination using network status and subsequent routing paths.

In yet another embodiment, the disclosure includes determining whether the packet data flow is active for a predetermined threshold time period; and transmitting additional data packets associated with the packet data flow to the spine switch in response to the determined packet data flow being active for the predetermined threshold time period.

In yet another embodiment, the disclosure includes obtaining at least one of a spine switch queue length and spine switch link utilization between the network adapter and a second spine switch; and transmitting the data packet to the second spine switch responsive to the hash value of the data packet not matching the flow ID in the flow table.

In yet another embodiment, the disclosure includes selecting a third spine switch according to a minimum of a queue length and link utilization of the third spine switch; and transmitting the data packet to the third spine switch responsive to the hash value of the data packet not matching the flow ID in the flow table.

In yet another embodiment, the disclosure includes a queue length comprises queue delay in a buffer of the spine switch.

In yet another embodiment, the disclosure includes determining a weighted value of each network element for at least one spine switch; and transmitting the data packet to the destination node using a higher weighted spine switch of the at least one spine switch.

In yet another embodiment, the disclosure includes assigning the flow ID of the data packet to the spine switch, the flow ID corresponding to the flow category of the data packets.

In another embodiment, the disclosure includes a system comprising a plurality of compute servers, each compute server of the compute servers being configured as either a source node or a destination node; a plurality of spine switches; and at least one leaf switch coupled to a compute server of the plurality of compute servers and to each spine switch of the plurality of spine switches, the at least one of each leaf switch including a memory comprising instructions and a processor coupled to the memory, the instructions causing the processor to be configured to determine whether a hash value of the data packet matches a flow identifier (ID) in a flow table; obtain a flow category of the data packet responsive to the hash value of the data packet matching the flow ID; and a transmitter coupled to the processor and configured to transmit the data packet to a spine switch of the plurality of spine switches using the flow category.

In yet another embodiment, the disclosure includes the processor configured to determine whether the packet data flow is active for a predetermined threshold time period, and the transmitter being configured to transmit additional data packets associated with the packet data flow to the spine switch in response to the packet data flow being active for the predetermined threshold time period.

In yet another embodiment, the disclosure includes the processor configured to obtain at least one of a queue length or link utilization between the network adapter and a second spine switch, and the transmitter being configured to transmit the data packet to the second spine switch responsive to the determined hash value of the data packet not matching the flow ID in the flow table.

In yet another embodiment, the disclosure includes the processor configured to select a third spine switch according to a minimum queue length and a link utilization between the network adapter and the third spine switch, and the transmitter configured to transmit the data packet to the third spine switch in response to the determined hash value of the data packet not matching the flow ID in the flow table.

In yet another embodiment, the disclosure includes the processor configured to determine a weighted value of each network element for the at least one spine switch, and the transmitter configured to transmit the data packet to the destination node using a higher weighted spine switch of the at least one spine switch.

In yet another embodiment, the disclosure includes the processor configured to assign the flow ID of the data packet to the spine switch, the flow ID corresponding to the flow category of the data packets.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
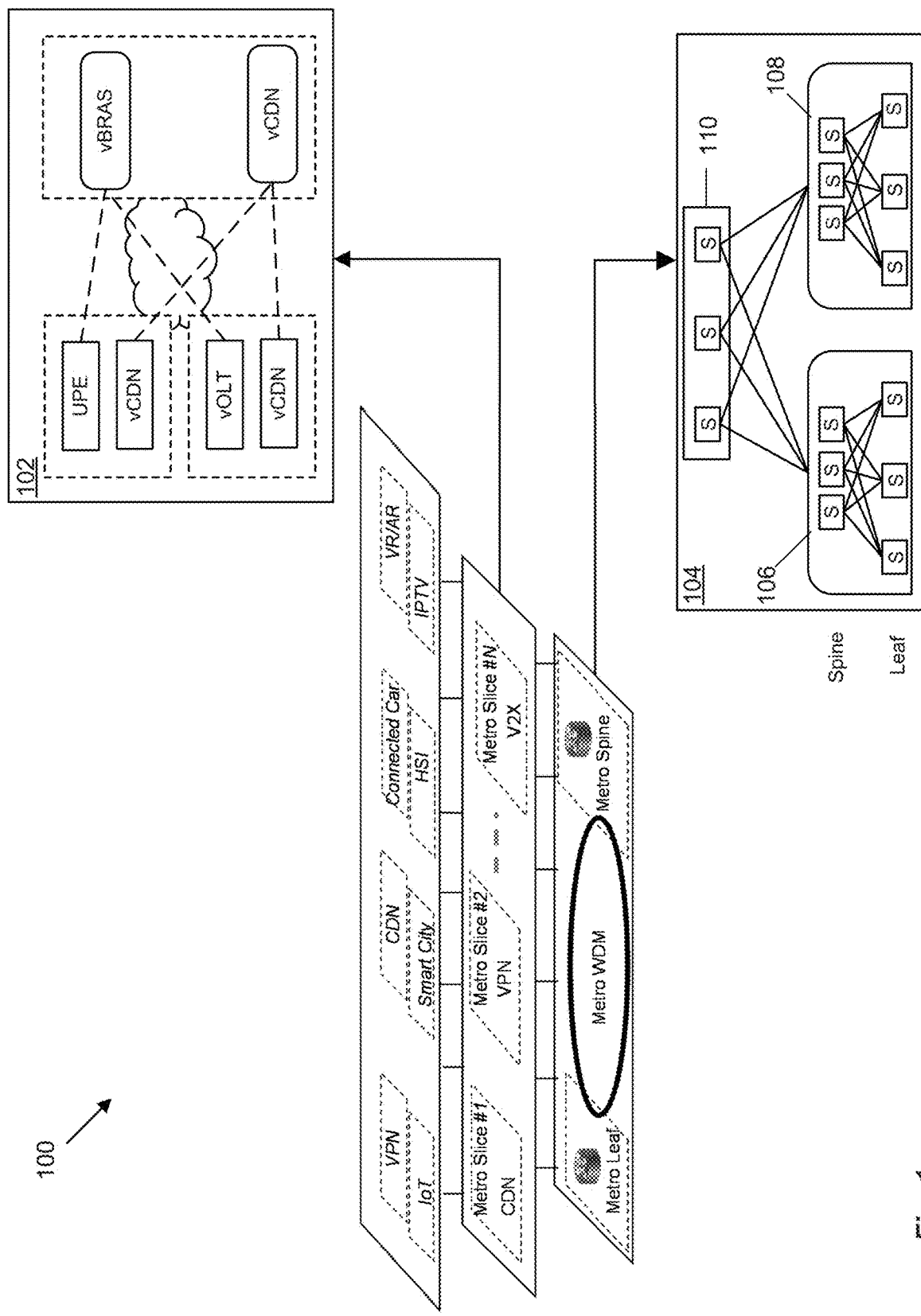
FIG. 1 is a schematic diagram of a decoupled overlay/underlay metro communication network according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and acronyms apply:
5G: Fifth Generation Network
AI: Artificial Intelligence
ASCII: American Standard Code for Information Interchange
ASIC: Application-Specific Integrated Circuit
ATM: Asynchronous Transfer Mode
BCD: Binary-Coded Decimal
BGP: Border Gateway Protocol
CBQ: Class-based Queueing
CDN: Content Delivery Network
CPU: Central Processing Unit
CO: Central Office
DCI: Datacenter Interconnect
DCN: Datacenter Network
DRL: Deep Reinforcement Learning
DNN: Deep Neural Network
DSP: Digital Signal Processor
DSCP: Differentiated Services Code Point
DWDM: Dense Wavelength Division Multiplexing
EBCDIC: Extended Binary Coded Decimal Interchange Code
ECMP: Equal Cost Multipath
E-LAN: Emulated Local Area Network
EO: Electrical-to-Optical
ERP: Enterprise Resource Planning
FPGA: Field-Programmable Gate Array
FlexE: Flexible Ethernet
ID: Identifier
ICMP: Internet Control Message Protocol
IGMP: Internet Group Management Protocol
IOT: Internet of Things
IP: Internet Protocol
IPv4: Internet Protocol version 4
IPv6: Internet Protocol version 6
IPTV: Internet Protocol television
IS-IS: Intermediate System to Intermediate System
JPEG: Joint Photographic Experts Group
L1: Layer 1 of the OSI model
L2: Layer 2 of the OSI model
L3: Layer 3 of the OSI model
L4: Layer 4 of the OSI model
L5: Layer 5 of the OSI model
L6: Layer 6 of the OSI model
L7: Layer 7 of the OSI model
M2M: Machine to Machine
MPLS: Multiprotocol Label Switching
MPLS TE: MPLS Traffic Engineering
OE: Optical-to-Electrical
OSI: Open Systems Interconnection
OSPF: Open Shortest Path First
OTN: Optical Transport Networking
OTT: Over-the-top
P2P: Peer-to-peer
POP: Point of Presence
QoS: Quality of Service
PSN: Packet Switched Network
PW: Pseudowire
RAM: Random-Access Memory
RF: Radio Frequency
ROM: Read-Only Memory
RX: Receiver Unit
RTT: Round-Trip Time
SDH: Synchronous Digital Hierarchy
SLA: Service Level Agreement
SONET: Synchronous Optical Networking
SRAM: Static RAM
TCAM: Ternary Content-Addressable Memory
TCP: Transmission Control Protocol
TX: Transmitter Unit
TCP/IP: Transmission Control Protocol/Internet Protocol
UDP: User Datagram Protocol
UPE: User-Facing Provider Edge
V2X: Vehicle-to-everything communication
vCDN: Virtual CDN
VLAN: Virtual Local Area Network
vOLT: Virtual Optical Line Terminal
VNF: Virtualized Network Function
VM: Virtual Machine
VPLS: Virtual Private LAN Service
VPN: Virtual Private Network As mentioned above, a metro network may include a network layer and a transport layer with different technologies being utilized. For instance, at a network layer, MPLS/MPLS-TE, Carrier Ethernet, IP, Segment Routing, OSPF/IS-IS/BGP routing protocols, or similar routing protocols are used while SONET/SDH, OTN, DWDM are used at a transport layer. As data and services are moved to the edge of the network, content caching and applications are also being moved from centralized data centers to distributed data centers so as to improve user experience. Aligned with the transfer of content and applications into a metro network is the deployment of additional data centers into the metro network by cloud providers and Internet content providers (for example, metro POPs). Service Providers may also use their real estate locations (for example, a central office) to deploy local data centers (for example, a telecom edge cloud) as edge cloud servers. The data centers may include telecom edge clouds and metro POPs that may store cached content and distributed application services as well as support VNFs. The VNFs may be deployed in any data center on demand as traffic patterns shift within the metro network. As traffic patterns become more dynamic, the metro network may provide rapid, high volume data connections between the various VNFs, and between VNFs and users regardless of where the VNFs are deployed such as, being deployed in a same rack, a same data center, or in a geographically distributed data center.

Borrowing a DCN architecture for a metro network may have to overcome essential differences and unique challenges. Besides traditional large (elephant) flows and short (mice) flows in a DCN, the metro network may also have to support streaming flows (for example, data flows for CDN/Video), business VPN data flows (for example, leased line services), and opportunistic data flows for big-data backup applications, or the like. Also, TCP/UDP traffic profiles are different in terms of burst intensity for a metro network and a DCN. Due to the large number of end users (for example, greater than 1 million per metro area, and growing for IoT devices), a metro area has to support 10 times more flows than a DCN. This growth may aggravate micro-Burst issues. Moreover, COs and Metro PoPs are geographically distributed. The optical transport links within a metro area can be up to 100 Kilometer (Km) ranges and use DWDM wavelengths with programmable bandwidths, and the wavelengths and bandwidths can vary substantially. In contrast, a DCN may have less than 2 Km uniform grey-optical links. Accordingly, a metro area latency (for example, approximately 1 millisecond (ms) for 100 Km propagation delay) cannot be ignored for some latency sensitive applications. Programmable Optical bandwidth (for example, 100 Gigabytes (G)/200 G/400 G per wavelength) and bandwidth slicing technologies such as a FlexE communication protocol may be used to address congestion and/or latency issues.

Disclosed herein is a unified leaf-spine metro network of a service and/or enterprise provider with three novel techniques, for example, a metroslice technique, a metrofinder technique, and a metroburst technique for routing network traffic in cloud-centric applications. The three techniques may be collectively organized as metroinsight techniques. The metroslice technique may perform detailed traffic flows classifications and real-time traffic profiling to isolate a plurality of types of traffic patterns in the metro network so as to provide a proper path for forwarding data traffic and to provide differentiated buffer management for lower latency of packets flow, higher bandwidth utilization, and smaller buffer sizes. A metrofinder technique may perform fine-grained dynamical path selection in order to transport large volumes of "East-West" M2M traffic flows between data centers and/or POPs. A metrofinder technique may be an ECMP technique for selecting a spine switch with a lower queue delay in order to improve traffic engineering (TE) through a metro network and permit the spine switch to route the data packet to a destination using network status and subsequent routing paths. By using the metrofinder technique to improve TE, service providers and/or enterprise providers may route more network traffic through the metro network and thereby accommodate additional users than can be accommodated in existing metropolitan communication networks. The metroburst technique may conduct buffer management to mitigate, in real-time, metro area microburst data flows. For instance, the metroburst technique may leverage AI technologies to monitor spine switch queue states and auto-tune the spine switch buffers based on microburst transmission.

FIG. 1 is a schematic diagram of a metro communication network 100 according to an embodiment of the disclosure. Metro communication network 100 comprises a metro overlay network 102 and a metro underlay network 104. Metro underlay network 104 may comprise a physical network infrastructure of leaf switches, spine switches, routers and optical network elements (collectively labeled "S") in order to deliver data packets between telecom edge cloud 106, metro datacenter/POP 108 and metro backbone spine 110. The optical transport links within metro underlay network 104 may be up to 100 Kilometers (KM) apart. Metro underlay network 104 may use fiber optic transmission techniques, for example, WDM technique, to send data packets between nodes.

Metro overlay network is a virtual network that is built on top of an infrastructure of the metro underlay network 104. Metro overlay network 102 may be decoupled or disaggregated from metro underlay network 104. In a decoupled network, network services of the metro overlay network 102 may be autonomous from other network services and autonomous with the underlying infrastructure of metro underlay network 104. Metro overlay network 102 may implement virtualized network slicing that may allow multiple logical networks to run on top of a shared physical network infrastructure of metro underlay network 104. Each slice in metro overlay network 102 may be configured with virtualized metro area applications or service elements that may provide a specific service to users of metro communication network 100. Networking service elements may include UPE, vCDN, vOLT, or the like that may be implemented as hardware or software. Metro area applications may include applications that provide services within metro communication network 100 such as, for example, OTT content sharing, Broadband internet services, or IPTV video distribution.

Figure 2:
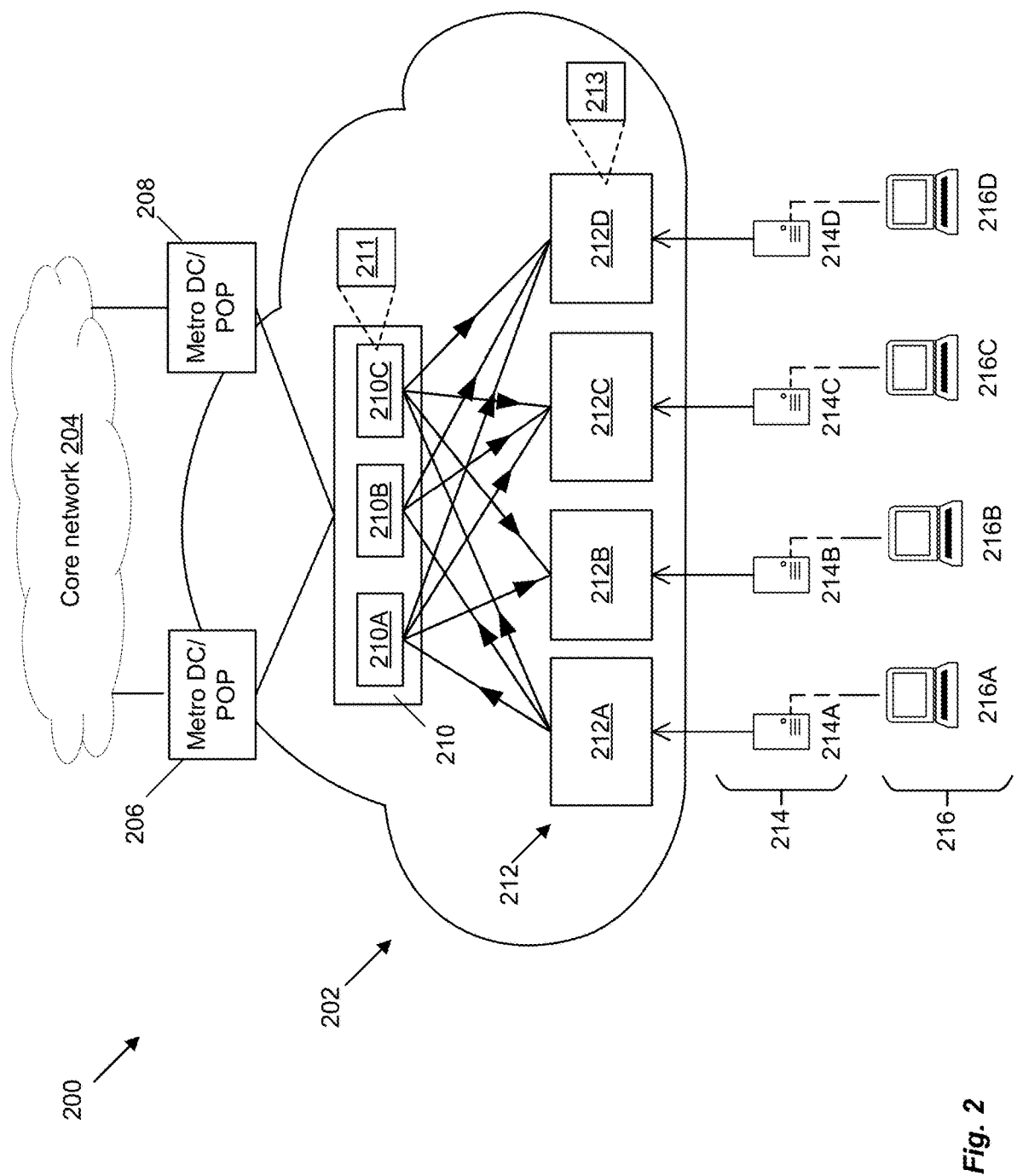
FIG. 2 is a schematic diagram of a metro underlay communication network for providing metroinsight techniques according to an embodiment of the disclosure.

FIG. 2 is a schematic diagram of communication architecture 200 according to an embodiment of the disclosure. Communication architecture 200 comprises metro underlay network 202 that is communicatively connected to core network 204. Metro underlay network 202 may be implemented as a hybrid-Clos network topology and may include a physical infrastructure of network elements such as leaf and spine routers, switches, optical transport elements, and network adapters or elements that are communicatively coupled together in a multi-tier architecture to forward data packets over multiple paths through underlay network 202.

The components of metro underlay network 202 may be referred to as nodes. Each of the nodes may be network elements such as a computer or server, a network device such as a switch, router, optical transponder, network adapter, a group of hardware computers or servers, a storage device, or a software function of a hardware computer or server. Though metro underlay network 202 shows a specific number of nodes, metro underlay network 202 may have any number of such nodes. Metro underlay network 202 may be a PSN that is configured to transmit and/or forward data packets in a data flow from a source node to a destination node over multiple paths. The nodes in metro underlay network 202 are connected by links and paths. As used in the disclosure, a direct connection between two nodes may be referred to as a link while a sum of all links (including any intermediate switches between the source and destination nodes) traveled by a data packet as part of a data flow from a source switch/router to a destination switch/router may be referred to as a path.

The nodes in metro underlay network 202 may be metro datacenters or metro POP 206 and 208, a metro backbone spine 210, central offices (CO) or telecom edge cloud 212A-212D, compute servers 214A-214D, and client end-user devices 216A-216D. Metro datacenters 206 and 208, metro backbone spine 210, and CO 212A-212D define metro underlay network 202. Metro underlay network 202 may be configured to route network traffic flows, to and from, or between nodes connected to service layers of an metro overlay network 102 (Shown in FIG. 1). In an embodiment, during routing of network flows through metro underlay network 202, the switches in nodes may implement one or more techniques that perform flow classification, optimal path and time period selection to permit the switches in the nodes to route network flows to a destination using routing flows and adaptive buffer configuration for cloud-centric applications in metro underlay network 202. The one or more techniques may comprise a metroslice technique, a metrofinder technique, and a metroburst technique (collectively referred to as "metroinsight techniques"), as discussed below.

Compute servers 214A-214D (collectively "214") may be connected to metro underlay network 202 through routers and/or switches. Compute servers 214 may be configured as the source nodes or destination nodes of metro underlay network 202. A compute server 214 may be a source node in one transmission path and a destination node in another transmission path. A compute server 214 may also be one of several destination nodes for another compute server. Client devices 216A-216D (collectively "216") may be communicatively coupled to metro underlay network 202 at compute servers 214. Client devices 216 may be configured to generate L2 or L3 data packets that are transmitted through communication architecture 200, discussed below. As used in the disclosure, the terms L2 and L3 define a layer functionality of an OSI model as applied to the metro underlay network 202, as discussed below in FIG. 3. Client devices 216 may comprise personal computers, servers, smartphones, laptops, IOT devices, vehicles, home appliances, or other similar devices. Client devices 216 may transmit and receive the L2 or L3 data packets between other client devices 216 or with metro datacenters 206, 208 via the links and the paths in metro underlay network 202.

Metro underlay network 202 includes CO 212A-212D (collectively "212") nodes. CO 212 (also referred to as a "local data center") may be a telecom edge cloud located at an edge of metro underlay network 202. In an embodiment, CO 212 may comprise physical or virtual network elements. CO 212 may virtualize network hardware into VNFs at CO 212 and enable network service functions to run at the edge of metro underlay network 202 through the network elements. CO 212 may be implemented in a Clos network topology. Each CO 212 may include a leaf switch that is configured with L2 or L3 functionality. The leaf switch may include a computer system or set of programs that an enterprise provider, a network provider, or a service provider such as Verizon®, AT&T®, or Sprint® operates in order to provide network services such as network connectivity, application support, or other support to compute servers 214 through the edge cloud at CO 212. In an embodiment, CO 212 may also include L2 or L3 spine switches that are connected to the leaf switches below it as a bipartite graph in a node (hereinafter depicted as metro leaf node 213). In metro leaf node 213, a leaf switch is directly connected to every spine switch, but a leaf switch is not connected to another leaf switch. In an embodiment, leaf switches at CO 212 may be configured to host a proxy function for performing a lookup of endpoint IP addresses in a mapping database for making data transmission and forwarding decisions through metro underlay network 202, on behalf of compute servers 214. The data transmission and forwarding decisions may be implemented using one or more metroinsight techniques such as, for example, metroslice, metrofinder and/or metroburst techniques. The leaf switches in CO 212 may be the end nodes of CO 212. As such, the leaf switches may directly connect to the nodes below it, for example, may directly connect to compute servers 214. The spine switches are the intermediate nodes above the leaf switches and may connect to the leaf switches below and additional switches above the spine switches. While four (4) CO 212A-212D nodes are illustrated in FIG. 2, metro underlay network 202 may have any number of CO 212 nodes. CO 212 may be distributed at various geographical locations throughout metro underlay network 202, and may be referred to as CO branches at the geographical distributed locations in metro underlay network 202.

A metro backbone spine 210 may comprise spine switches 210A, 210B, and 210C. Spine switches 210-210C may be connected to the leaf switches in CO 212 below and to the metro datacenters (DC) 206, 208 above. Metro backbone spine 210 may be implemented in a Clos network topology and may be implemented with L3 functionality. In an embodiment, metro backbone spine 210 may include spine switch 210A-210C that is coupled to a L3 leaf switch within spine switch 210A-210C node (shown as metro spine node 211). Each spine switch 210A-210C may be connected to every leaf switch in CO 212 as a bipartite graph such as, for example as metro leaf node 213. The coupling between CO 212 and backbone spine 210 may represent a two-tier leaf-switch network, with tier 1 at the leaf switches of CO 212 and tier 2 at the spine switches of metro backbone spine 210. In an embodiment, metro backbone spine 210 may perform routing for metro underlay network 202. In an embodiment, the routed network traffic from CO 212 to backbone spine 210 may traverse one hop from CO 212 to reach a default gateway at metro backbone spine 210 in order for the outbound data flow or the inbound data flow to be routed to from a CO 212 to other CO 212 or metro DC/PoP 206, 208. Data packets that are sent from originating host and destination nodes at compute servers 214 may be forwarded through the leaf and/or spine switches in CO 212, and metro backbone spine 210 to destination nodes. Metro backbone spine 210 may function as the L3 boundary and the server gateway to metro datacenters 206 and 208. In an embodiment, metro backbone spine 210 may perform intra-VLAN frame switching, inter-VLAN routing for east-west internal network traffic through metro underlay network 202, and may exchange routing adjacency information with Layer 3 (e.g., BGP VPN) routed uplinks to route north-south network traffic through metro underlay network 202.

Metro datacenters 206 and 208 may represent the core layer of metro underlay network 202. Metro datacenters 206, 208 may be cloud-based datacenters that are associated with a service provider or an enterprise service provider. Each metro datacenter 206, 208 may comprise a POP facility that houses servers, routers, network switches, multiplexers, other network interface equipment, and associated components, such as telecommunications and storage systems. The POP facility may be an access point to core network 204. Though metro underlay network 202 shows a specific number of metro datacenters, the metro underlay network 202 may have any number of such metro datacenters 206, 208. Metro datacenters 206, 208 may host one or more services, for example, data or application services for host and destination nodes. These services may be accessed from metro backbone spine 210 using IP routing addresses as part of the L3 functionality to connect to metro datacenters 206, 208. Metro datacenters 206, 208 may be collocated within metro underlay network 202 or may be geographically distributed at different locations in metro underlay network 202.

Core network 204 (also referred to as a backbone network) is an external IP network such as, for example, the Internet. Core network 204 is a communication network with network devices, for example, routers and switches that may send and receive data using network and data link layer technologies, including ATM, IP, SONET, and DWDM between metro underlay network 202 and other external networks.

In operation, a CO 212 node in metro underlay network 202 may be configured to implement the metroinsight techniques so as to perform enhanced flow routing techniques, discussed below, in order to route network traffic, to and from, or between source and destination nodes in metro underlay network 202. For instance, a network adapter or a switch at CO 212A may implement the metroinsight techniques to route L3 packet data flows from a client device 216A to other client devices 216B-216C using CO 212 and backbone spine 210. Other client devices 216B-216C may be coupled to the destination nodes of metro underlay network 202. Other COs 212B-212D may be configured similarly to route the L3 data packets as described herein in the present disclosure.

In an embodiment, a network element, for example a network adapter, at CO 212A may obtain a current network status of links and/or paths from CO 212A to other destination nodes in metro underlay network 202. The current network status may be retrieved from a network status table that may be stored at CO 212A. The current network status may comprise a total path delay for each link and path in metro underlay network 202, which is discussed below. Network element at CO 212A may determine a network status for each path using a probe packet. For instance, a network adapter may transmit a probe packet to other destination nodes using multiple paths and may monitor the RTT of the probe packet for each path to the destination nodes. The network adapter may determine a total path delay to each destination node using the information received from each destination node. The total path delay may represent a current network status for each link and path in metro underlay network 202. The network adapter may also store the current network status for each link and path in the network status table.

Network element at CO 212A may mark a metro area application and the current network status to transmit and/or forward the L3 data packets through metro underlay network 202. For example, the metro area application may indicate that the L3 data packets are high-priority and, in this scenario, the L3 data packets may be transmitted using the lowest latency link and/or path determined from the network status table that is stored at CO 212A. CO 212A may be configured to transmit the L3 data packets in near real-time to a destination node or to transmit and/or forward the L3 data packets to an intermediate storage device for storage. In a first example, the L3 data packets may be transmitted in near real-time to a destination node such as, for example, a compute server 214D when the application classifies the L3 data packets as being of high-priority. In embodiments, high-priority data comprises data that is associated with a voice application or data associated with a leased line as part of a SLA. In a second example, CO 212A may transmit the L3 data packets in near real-time to a destination node when the L3 data packets are classified as low-priority data packets and network utilization of paths within the metro underlay network 202 is lower than a first predefined threshold percentage. The first predefined threshold may be 40 percent (%). In a third example, CO 212A may delay transmitting the L3 data packets and store the L3 data packets at CO 212A when the L3 data packets are classified as low-priority data packets and network utilization of paths within metro underlay network 202 is greater than a second predefined threshold percentage. In an embodiment, the L3 data packets may be stored at a server at CO 212A when the second predefined threshold percentage is greater than or equal to 60%. When the network utilization is lower than 60% at a later time period, CO 212A may transmit the low-priority data packets to the destination node. Other network utilization percentages are also contemplated in the scope of the disclosure. In an embodiment, the low-priority data packets may be forwarded to another node for storage in lieu of storing the low-priority data packets at CO 212A. At a later time, CO 212A may notify the other node to begin transmission of the low-priority data packets when network utilization is lower than the second predefined threshold percentage, for example, lower than 60%.

In another embodiment, a network adapter at CO 212A may compare a packet data flow received at an ingress port of CO 212A to a flow category lookup table in order to determine whether a flow ID of the data packet or packets are associated with a predetermined flow category. The network adapter may determine a flow category of the packet data flow 702 using a hash function of a 5-tuple label. For instance, network adapter may use a hash function to obtain a hash value of a 5-tuple label of header fields in the data packet and use a flow category lookup table to determine whether the hash value of the 5-tuple label is associated with a flow category in flow category lookup table. The 5-tuple label may include a source IP address, a destination IP address, a source port, a destination port, and transport protocol. Network adapter at CO 212A may also process a subset of data packets of packet data flow with using an AI technique when a flow ID of the data packet is not associated with a flow category. The AI technique may use a machine learning model to identify a flow category of a first subset of data packets.

In another embodiment, network adapter at CO 212A may use the flow category information from the AI technique and/or the flow category information from the flow category lookup table to identify flow categories of data packets in the packet data flow. Network adapter may send the data packets that are classified according to their flow categories to a buffer for storage. In an embodiment, each flow category may include a priority level that may be to perform optimal path selection in order to transmit packet data flows to one or more spine switches of backbone spine 210.

In another embodiment, a network adapter at backbone spine 210 may include an intelligent module to tune buffer requirements for packet data flows that are received at backbone spine 210. For instance, a network adapter may continuously monitor a queue state of a buffer and flow rates of packet data flows entering or leaving a buffer queue at backbone spine 210. A buffer queue may be allocated to different flow categories according to class-based queuing (CBQ), and each buffer queue for a flow category may be shared with flows coming from different leaf switches. Packet data flows for a flow category may be received from multiple leaf switches at a spine switch and stored in a buffer allocated for the flow category. Network adapter may also monitor input rate of data packets entering a buffer queue, output rates of data packets leaving the buffer queue, a length of a buffer queue, and a size of the buffer queue.

Figure 3:
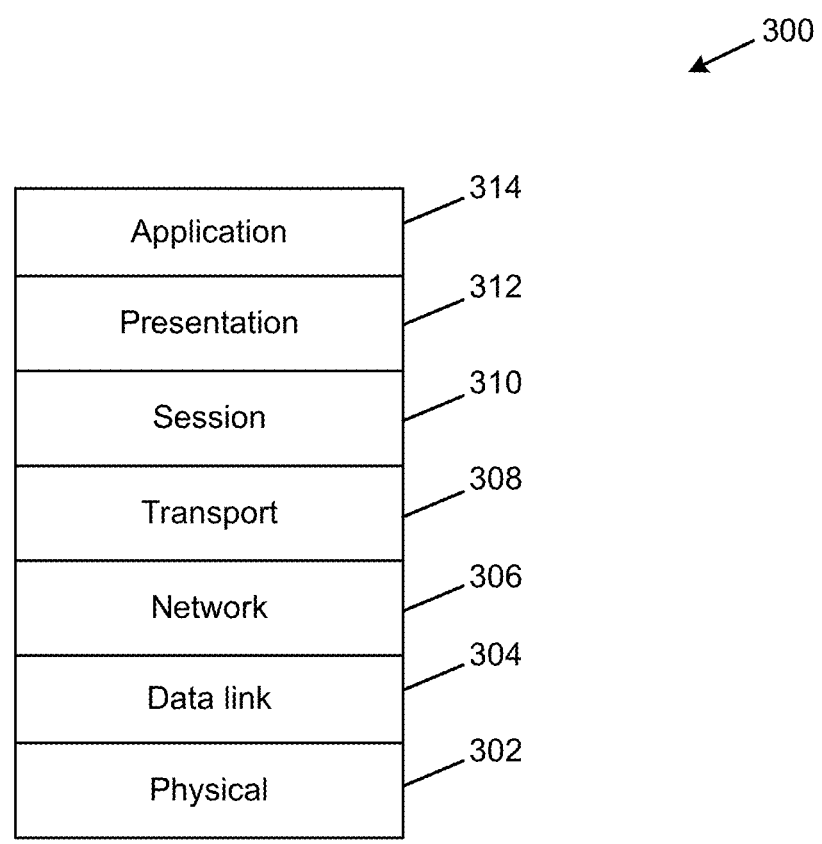
FIG. 3 is a schematic diagram of a network protocol model according to an embodiment of the disclosure.

FIG. 3 is a schematic diagram of an OSI model 300. OSI model 300 comprises layers 302 through 314. Each layer 302-314 defines the communication functions of a computing system, where a layer serves the layer above it.

Layer 302 is L1 or the physical layer. The physical layer is the lowest layer of the OSI model 300. Layer 302 refers to standards that deal with the physical characteristics of the transmission medium, including connectors, pins, use of pins, electrical currents, encoding, light modulation, and the rules for how to activate and deactivate the use of the physical medium.

Layer 304 is L2 or the data link layer. The data link layer is above the physical layer. The data link layer defines the rules that determine when a node can send data over a particular physical medium. Data link protocols also define the format of a header and trailer that allows client devices attached to the physical medium to send and receive data.

Layer 306 is L3 or the network layer. The network layer is above the data link layer. The network layer defines logical addressing, routing (forwarding), and path determination when sending data. Routing defines how routers in the nodes forward packets to a final destination. Logical addressing defines how each client device may have an address that can be used by the routing process. Path determination refers to how the routing protocols learn all possible routes, and choose the best route.

Layer 308 is L4 or the transport layer. The transport layer is above the network layer. The transport layer relates to issues such as error recovery and control when transmitting data from one client device to another client device.

Layer 310 is L5 or the session layer. The session layer is above the transport layer. The session layer defines how to start, control, and end conversations (called sessions) between client devices. Sessions may include the control and management of multiple bidirectional messages so that a user application can be notified if only some of a series of messages are completed. This allows the presentation layer to have a seamless view of an incoming stream of data.

Layer 312 is L6 or the presentation layer. The presentation layer is above the session layer. The presentation layer defines and negotiates data formats, such as ASCII text, EBCDIC text, binary, BCD, and JPEG. Encryption is also defined by OSI model 200 as a presentation layer service.

Layer 314 is L7 or the application layer. The application layer is the highest layer of the OSI model 300. The application layer provides an interface between the communications software and any applications that need to communicate outside the client device on which the application resides. The application layer also defines processes for user authentication. OSI model 300 is described in the International Organization for Standardization (ISO) document ISO/IEC 7498-1, November 1994, which is incorporated by reference.

Figure 4:
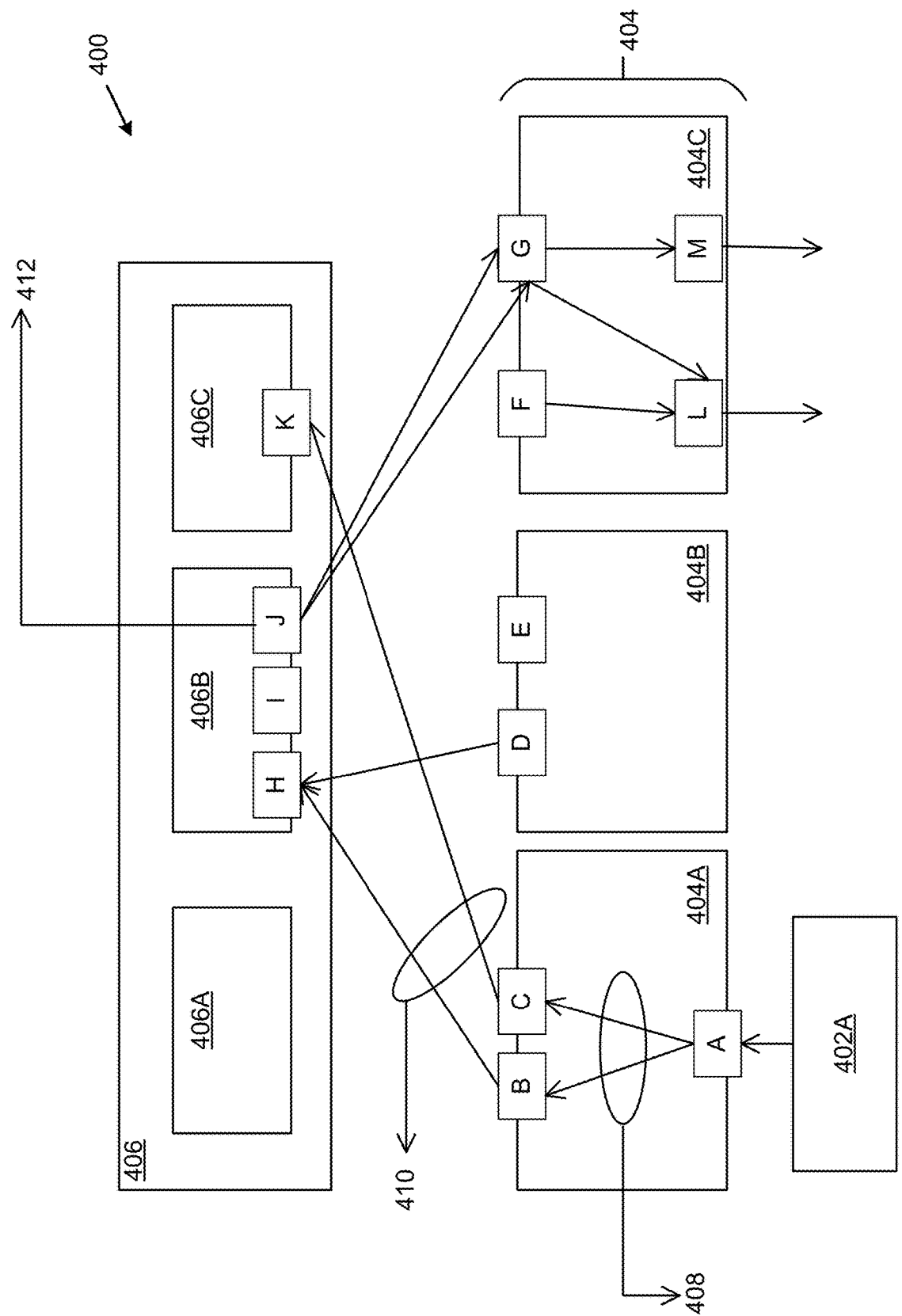
FIG. 4 is a schematic diagram of a leaf-spine topology of FIG. 2 for providing metroinsight techniques according to an embodiment of the disclosure.

FIG. 4 illustrates a schematic diagram of a leaf-spine topology 400 for the metroinsight techniques to control packet flows in a metro underlay network 202 of FIG. 2 and permit a spine switch in the leaf-spine topology 400 to route packet flows to a destination using network status and subsequent routing paths according to an embodiment of the disclosure. Leaf-spine topology 400 may include metro leaf 404 and metro backbone spine 406. Metro backbone spine 406 may be metro backbone spine 211 and metro leaf 404 may be metro leaf node 213, of FIG. 2. Metro leaf 404 may include substantially similar leaf switches 404A-404C. Each leaf switch 404A-404C may include network ports that may receive packet data flows from their respective originating nodes or may receive data packet flows from spine switches at metro backbone spine 406 that originate at leaf switches 404A-404C. For instance, leaf switch 404A is shown with network ports A-C; leaf switch 404B is shown with network ports D and E; and leaf switch 404C is shown with network ports F, G, L and M. Metro backbone spine 406 may include spine switches 406A-406C with network ports. For instance, spine switch 406B is shown with network ports H, I and J; and spine switch 406C is shown with network port K. While metro leaf 404 and metro backbone spine 406 is illustrated with network ports A-M shown in FIG. 4, additional network ports may also be provides in metro leaf 404 and metro backbone spine 406.

In an embodiment, network ports may be connected to other network ports in leaf-spine topology 400. Network ports may be configured as ingress network ports and/or egress network ports. Packet data flows that are received at a particular ingress network port may be routed to a particular network port at a spine switch 406A-406C in order to route the packet data flow to a destination metro leaf 404A-404C. For instance, as shown in FIG. 4, network port B may be connected to network port H, network port C may be logically connected to port K, and network port J may be connected to network port G. Flow categories may include mice flows, elephant flows, dedicated flows, standby flows, or the like. Also, spine switches at metro backbone spine 406 may include network ports that are connected to network ports at destination leaf switches In an embodiment, each packet data flow that may be received at an ingress network port of a leaf switch (for example, leaf switch 404A) may be routed to a network port at a destination leaf switch (for example, leaf switch 404C) using a network port at a spine switch at metro backbone spine 406. The network ports may be connected or coupled to other network ports and may be configured to route particular data packet flow using the same network ports from originating and destination leaf switches via the metro backbone spine 406 and permit the spine switch to route the data packet to a destination using network status and subsequent routing paths. In an embodiment, packet data flows may be routed through the same ingress and egress network ports based on the flow category. In an example, a packet data flow that is received at network port A may be transmitted to network port G via network ports H and J. In other embodiments, packet data flows may also be transmitted through a particular network port using latency, loss sensitivity, or throughput sensitivity.

In an embodiment, leaf-spine topology 400 may implement metroinsight techniques on an example metro leaf node 213 (FIG. 2) and an example metro spine node 211 so as to transmit and receive data packets through metro underlay network 202 using adaptive load balancing of packet flows. The metroinsight techniques may use several techniques in leaf-spine topology 400. For instance, leaf-spine topology 400 may use a metroslice technique 408 for real-time flow classification and pattern recognition of packet data flows that are received by the metro leaf node 404A-404C, a metrofinder technique 410 that performs an enhanced ECMP routing method with continuous verification for optimal flow path and spine switch selection for transmitting packet data flows by metro leaf node 404A-404C, and a metroburst buffer management technique 412 at metro spine node 406A-406C for buffer management that mitigates microburst transmission of packet data flows at metro spine node 406A-406C.

In an embodiment, a network element such as, for example, a network adapter at metro leaf node 404A may implement a metroslice technique on packet data flows that are received by the network adapter at a leaf switch from an originating node 402A. The metroslice technique may perform classification and pattern recognition on packet data flows in order to determine flow profiles of the packet data flows. For instance, a flow profile for a packet data flow may utilize five tuple (5-tuple) information in the packet data flow, flow duration, average data rate of a flow, or the like. The 5-tuple information may be used to obtain flow identifiers and recognize data flow type when the flow identifiers are not found in a flow profile table, as discussed below. The metroslice technique is shown and described below in FIGS. 5A and 5B.

Figure 5A:
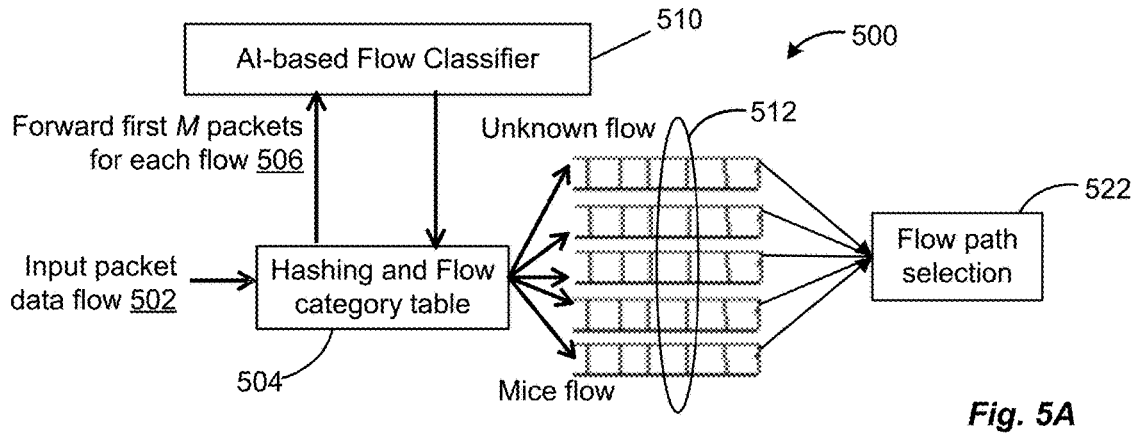
FIG. 5A is a schematic diagram for a principle of operation of a metroslice technique according to an embodiment of the disclosure.

FIG. 5A is a schematic diagram 500 illustrating a principle of operation of a metroslice technique according to an embodiment of the disclosure. While the metroslice technique is illustrated with an example metro leaf node 404A of FIG. 4, metroslice technique may be also be implemented with other metro leaf nodes 404B-404C. With continued reference to FIG. 4, a network adapter at metro leaf node 404A may receive a packet data flow based on data transmission from a transmitting node. For instance, a network adapter at a leaf switch in metro leaf node 404A may receive packet data flow 502 from node 402A at an ingress port of metro leaf node 404A. The packet data flow 502 may be compared with packet data flows in a flow category lookup table 504 in order to determine whether a flow ID of one or more data packet in packet data flow 502 is associated with a predetermined flow category. In an embodiment, flow categories in flow category lookup table may include a dedicated data flow, a mice data flow, an elephant data flow, a standby data flow, or an unknown data flow. The flow category of packet data flow 502 may be determined using a hash function of a 5-tuple label and first M packets of the flow 506. For instance, a hash function may be used to obtain a hash value of a 5-tuple label of header fields in the data packet of packet data flow 502. The 5-tuple label may include a source IP address, a destination IP address, a source port, a destination port, and transport protocol. The hash value of the 5-tuple label may be compared with data values in flow category lookup table 504 to determine whether the hash value of the 5-tuple label is associated with a flow category in flow category lookup table 504.

Network adapter may also forward a subset of data packets of packet data flow 502 to AI-based flow classifier module 510 when a flow ID of the data packet is not associated with a flow category. In an example, network adapter may forward first M data packets 506 (for example, 1-100 data packets) to AI-based flow classifier module 510 for classification and pattern recognition. AI-based flow classifier module 510 may use a machine learning model to identify a flow category based on the first M data packets 506 of the flow. Flow category information that is obtained according to first M data packets 506 by AI-based flow classifier module 506 may be sent by AI-based flow classifier module 506 to flow category lookup table 504.

Network adapter may use the flow category information from AI-based flow classifier module 510 and/or the flow category information from flow category lookup table 804 to identify and classify flow categories of data packets in packet data flow 502. Network adapter may send the classified data packets using flow category to buffer 512 for forwarding. As data packets in buffer 512 are stored according to their flow categories, each flow category may include a priority level that may be used by flow path selection module 522 for performing optimal path selection in order to transmit packet data flows 502 to one or more spine switches of metro spine node 406A-406C.

Figure 5B:
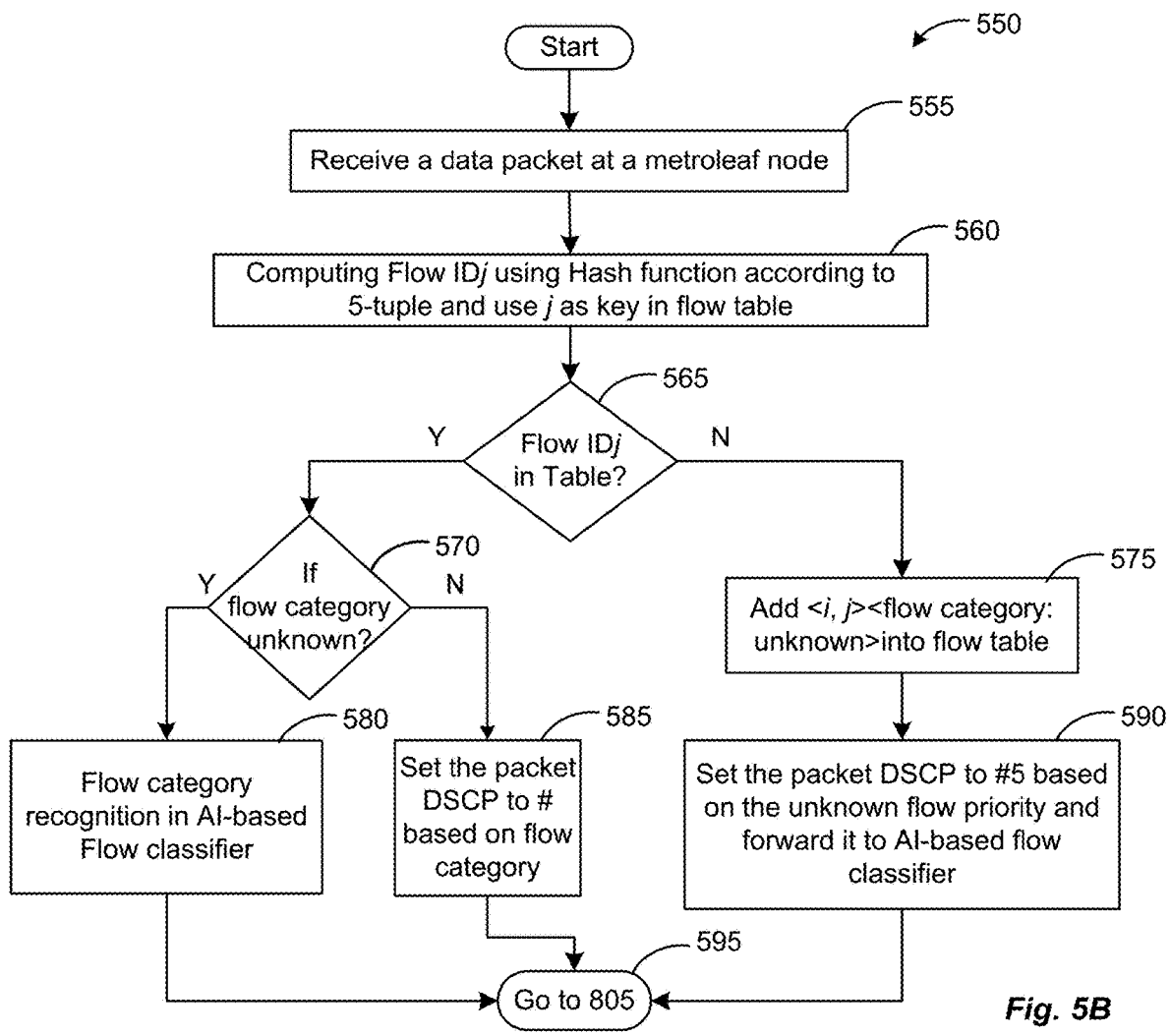
FIG. 5B is a flowchart illustrating a method for implementing the metroslice technique according to an embodiment of the disclosure.

FIG. 5B is a flowchart illustrating a method 550 for implementing the metroslice technique according to an embodiment of the disclosure. A network element at metro leaf node 404A (FIG. 4) may implement the method 550 on a packet data flow 502. While the metroslice technique is illustrated with an example metro leaf node 404A, metroslice technique may be also be implemented with other metro leaf nodes 404B-404C.

With reference to FIGS. 4 and 5A-5B, at step 555, a metro leaf node 404A may receive packet data flow 502 from a transmitting node. For instance, a network adapter associated with a leaf switch at metro leaf node 404A may receive packet data flow 502 from a server at node 402A at an ingress port i of a leaf switch. In an embodiment, packet data flow 502 at an ingress port i may be associated with one or more flow categories. Flow categories, as shown in Table 1, may include a dedicated data flow, a mice data flow, an elephant data flow, a standby data flow, or an unknown data flow. In an embodiment, a dedicated data flow may be associated with packet data flows for enterprise leased line services such as E-line communications, E-LAN, VPLS, DCI, slicing applications, or other similar applications. In an embodiment, a mice flow may be associated with high burst rate data flow for short-lived applications such as Gaming, Collaboration, interactive applications, distributed computing, V2X, mission-critical application flows, big data analytics, mobile backhaul, or other similar applications. In an embodiment, an elephant flow may be associated with long-lived packet data flows that transmit large volumes of data such as applications associated with streaming video, CDN, data replication, high-speed Internet access, Smart City/smart home traffic such as video surveillance, or other similar applications, a standby flow may be associated with packet data flows for applications such as best effort application, database backups, software upgrading applications, P2P applications, or other similar applications. In an embodiment, an unknown flow may be a data flow associated an application that is not recognized by metroslice technique. Additional fields for packet data flow may include priority, latency sensitivity, loss sensitivity, or throughput sensitivity. Table 1 may also be used in the metrofinder and metroburst techniques discussed below to assure flow QoS.

TABLE 1

| Flow Category | Priority | Latency-sensitive | Loss-sensitive | Throughput sensitive |
| --- | --- | --- | --- | --- |
| Dedicated flow | Highest (#7) | Y | Y | Y |
| Mice flow (micro flow) | Higher (#6) | Y | Y | N |
| Elephant flow (macro flow) | Higher (#6) | N | N | Y |
| Standby flow | Lowest (#0) | N | N | N |
| Unknown flow | High (#5) | Y | Y | N |

At step 560, network adapter may determine a flow ID (j) of a data packet using a hash function of a 5-tuple label, and use the flow ID j as a key attribute in a flow profile table. In an embodiment, flow profile table may be the flow category lookup table 504. For instance, network adapter may use a hash function to obtain a hash value of a 5-tuple label of a header in a data packet. The network adapter may use a flow profile table to determine whether the hash value matches the flow ID j in flow profile table. The 5-tuple label may include a source IP address, a destination IP address, a source port, a destination port, and the transport protocol.

At step 565, network adapter may determine whether the flow ID j matches a flow ID in a flow profile table. The flow profile table is shown in Table 2 and may include attributes of network port ID and flow ID as a key attribute field, a flow category, and a flow profile. If flow ID j does not match flow ID (flow ID j is not found in flow profile table and Step 565="N"), then data packets in packet data flow may be associated with a new flow category, and step 565 proceeds to step 575.

At step 575, network adapter may add an unknown flow category for the data packet in a flow profile table. The flow category called unknown may be assigned a network port ID and flow ID. The network port ID may represent the network port of the leaf switch and the flow ID may represent a hash value of the 5-tuple label of the data packet of the packet data flow. The flow category and flow ID may be a new category for the data packet that is stored in Key field in flow profile table. Flow profile table may also be updated with a Key field that includes an ingress network port number and flow ID value, a flow category, and flow profile for an unknown category of packet data flow 502. In an embodiment, the flow ID j of the data packet may be assigned to an "unknown" flow category. The network port number i in the Key field may contain a value representing a network port where the packet data flow was received. Flow profile table, as shown in Table 2, may include a Key field with network port number and flow ID, a flow category, and a flow profile.

TABLE 2

| <Ingress Port i, Flow ID j> | Flow Category | Flow Profile |
|---|---|---|
| <1, 200281> | Mice flow | High bursty (MAX_BURST = 10 ms) |
| <3, 895623> | Unknown flow | Unknown |
| <6, 768764> | Dedicated flow | Throughput ~400 Mb/s |
| ... | ... | ... |

At step 590, network adapter may assign a DSCP value to packet data flow 502 and forward the data packets 506 of packet data flow 502 to AI-based flow classifier module 510. In an embodiment, the DSCP value may correspond to an unknown flow category in the flow profile table and may represent a priority value of #5 of Table 1. In an embodiment, the DSCP value may be written to a "Traffic Type" field in an IP packet header field (FIG. 5). Step 590 proceeds to step 595.

However, if at step 565, flow ID j matches flow ID in flow profile table (Step 565="Y"), then packet data flow may be associated with an existing flow category, and step 565 proceeds to step 570.

At step 570, network adapter may determine a flow category for data packets of packet data flow 502. If a flow category for the data packets in packet data flow is an "unknown" flow category in flow profile table (Step 570="Y"), then step 570 proceeds to step 580.

At step 580, network adapter may determine a flow category based on first M data packets 506 using AI-based flow classifier module 510. For instance, a predetermined number of M data packets 506 may be forwarded by network adapter to AI-based flow classifier module 510 for analysis of a flow category in the M data packets 506. AI-based flow classifier module 510 may identify and classify flow categories by using a machine learning model to recognize, in real-time, a flow category according to the first M data packets 506 of a received flow. In an embodiment, M may be a predetermined or predefined number between 1 and 256. A traffic flow profile may include flow categories, shown in the table 1, as well as additional categories of an estimated flow size, an approximate average rate, an approximate bursty rate, or average throughput/latency requirements. If AI-based flow classifier module 510 successfully identifies a flow category of that the received flow based on the first M data packets 506, additional data packets for the received flow may not be forwarded to AI-based flow classifier module 510 for analysis. Further, flow profile table may be updated with a network port ID and flow ID j for the data packet in the packet data flow 502. Step 580 proceeds to step 595.

However, at step 570, if a flow category for packet data flow 502 is associated with a flow category already in flow profile table (Step 570="N"), then step 570 proceeds to step 585. At step 585, network adapter may assign a DSCP value to an IP packet header field for the packet data flow 502. In an embodiment, the DSCP value may be a priority value that is shown and described in Table 1. Step 585 proceeds to step 595. At step 595, network adapter may monitor the link for additional data packet flows and process the data packet according to step 555, otherwise method 550 proceeds to step 805 (FIG. 8) when additional packet data flows are not received.

Referring back to FIG. 4, each leaf switch at metro leaf node 404A-404C may implement the metroinsight techniques to continuously verify multipath data packet flows. For instance, the metroinsight techniques may use multiple paths of data packet flows such as, for example, on data packet flow 502 by using information stored in a flow profile table in order to determine optimal paths for routing packet data flows from an egress network port of a leaf switch at metro leaf node 404A to an ingress network port of a leaf switch at metro leaf node 404C via metro spine node 406B. In an embodiment, metro leaf node 404A may be configured to determine optimal paths including multiple paths to a metro leaf switch of metro leaf node 404C by using continuous path verification. Continuous path verification may transmit periodic probe packets to another metro leaf node 404A-404C via spine switch at metro spine node 406B. In an embodiment, continuous path verification may use path performance metrics including RTT, queue length, and link utilization to determine the optimal path for transmitting data packets from an origination leaf switch at metro leaf node 404A to a destination leaf switch at metro leaf node 404B-404C via metro spine node 406A-406C.

A probe packet may be an L3 data packet that may be used to determine queue length of a metro spine node 406A-406C, a network status of each link and each path from an originating leaf switch to a destination leaf switch in leaf-spine topology 400. In an embodiment, metro leaf node 404A may transmit probe packets to another leaf switch at a destination metro leaf node 404B-404C using different network ports of metro spine node 406A-406C. For instance, originating metro leaf node 404A may transmit a probe packet from a network port A and use each path/spine switch that connects the originating metro leaf node 404A to destination metro leaf node 404B-404C. Probe packets may be repeatedly transmitted from an originating metro leaf node 404A to a destination metro leaf node 404B-404C in order to detect a change in the network status over time. In an embodiment, originating metro leaf node 404A may also determine a network status for paths to other nodes in the metro underlay network 202 including paths from originating metro leaf node 404A to metro datacenters 206, 208 of the metro underlay network 202.

The originating metro leaf node 404A may monitor the RTT between transmitting a probe packet across each path and receiving a response packet from each destination metro leaf node 404B-404C. The response packet may be sent by a destination metro leaf node 404B-404C using the same path (for example, same spine switch of a metro spine node 406A-406C) that was originally used to send the probe packet. The response packet may provide network utilization information for each leaf switch in metro leaf node 404A-404C. Using the response packet, the originating metro leaf node 404A may determine a total path delay/RTT for each path from a leaf switch at originating metro leaf node 404A to a leaf switch at destination metro leaf node 404B-404C. The total path delay/RTT may represent a network status of a link and a path in the metro underlay network 202. As some links between the originating metro leaf node 404A and the destination metro leaf node 404B-404C may be broken, the originating metro leaf node 404A may also identify the broken link by monitoring whether a response packet from the destination metro leaf node 404B-404C has been received within a predetermined or predefined threshold time. In some examples, a predefined threshold time may be set at 1 milliseconds (ms), 10 ms, or 100 ms when a RTT message has not been received within the predetermined threshold time, originating metro leaf node 404A may determine the link as a broken link.

The total path delay/RTT, as shown in Table 5 below, may be a sum of the spine switch queue length in microseconds (us), as shown in Table 3 below, and link utilization, as shown in Table 4 below. The total path delay may be determined using the RTT of the probe packet. Spine switch queue length may be the delay encountered by a packet between the time of insertion into the leaf-spine topology 400 at an originating metro leaf node 404A and the time of delivery to a destination metro leaf node 404B-404C via metro spine node 406A-406C based on data packets that are stored in a buffer at metro spine node 406A-406C and awaiting delivery to a destination metro leaf node 404B-404C. Link delay may be link utilization of a link between originating metro leaf node 404A and destination metro leaf node 404B-404C. Total path delay for a network traffic path from an originating metro leaf node 404A to a destination metro leaf node 404C may be stored in a routing table at the originating metro leaf node 404A. Total path delay may be used by metroinsight algorithm for continuous verification of network status of links and paths, shown and described in FIG. 6, for selecting an optimal path and spine switch for transmitting data flow traffic through metro underlay network 202.

TABLE 3

| Spine switch queue length | Queue Length (us) |
|---|---|
| Destination 1, Path 1, Spine | 1000 |
| Destination 1, Path 2, Spine | 500 |
| ... | ... |

TABLE 4

| Link | Link Utilization (%) |
|---|---|
| Path 1 Link 1 | 80 |
| Path 1 Link 2 | 20 |
| ... | ... |

TABLE 5

| Total Path RTT | Total Path Delay (us) |
|---|---|
| Destination 1, Path 1 | 800 |
| Destination 1, Path 2 | 700 |
| ... | ... |

Figure 6:
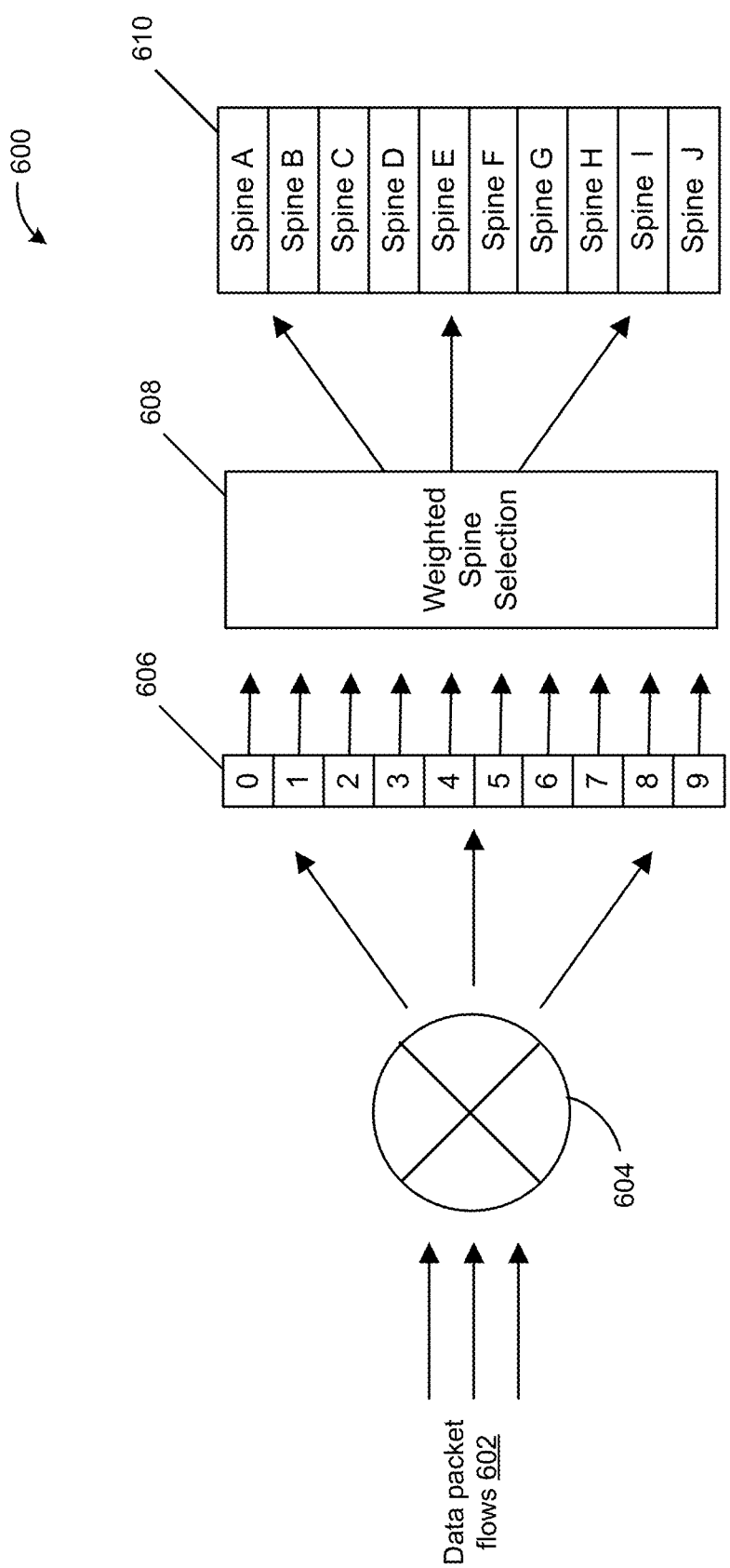
FIG. 6 is a schematic diagram illustrating a metrofinder technique for traffic flow path selection according to an embodiment of the disclosure.

FIG. 6 is a schematic diagram 600 illustrating use of the metrofinder technique to adaptively select a path for a traffic flow according to an embodiment of the disclosure. With continued reference to FIG. 4, each metro leaf node 404A-404C may be configured to implement the metrofinder technique for traffic flow path selection. In an embodiment, data packet flows 602 may be received at a hash module 604. Hash module 604 may determine a 5-tuple hash value using a hash function of a 5-tuple label. For instance, network adapter may use a hash function to obtain a hash value of a 5-tuple label of header fields in data packet flows 602. Hash values may be stored in hash buckets at a storage module 606. Hash values may be sent to a spine selection module 608 where different weights may be assigned to the hash values. The weights may be used by the metrofinder technique to transmit the data packet flows 602 to metro spine switches 406A-406C based on path performance metrics. Path performance metrics may include link utilization, RTT, and spine switch queue length. Assigned weights may influence which metro spine switches 406A-406C have a priority. In an embodiment, the weights may range between 1 and 255. For instance, different weights may be assigned in order to influence selection of spine switches 406A-406C and ensure optimal load balancing of packet data flows. In an embodiment, a flow category may be assigned a different weight based on its data flow size. For instance, for a mice flow, a lower RTT or lower link utilization may be assigned with a higher weight or a higher RTT or higher link utilization may be assigned with a lower weight.

Figure 7:
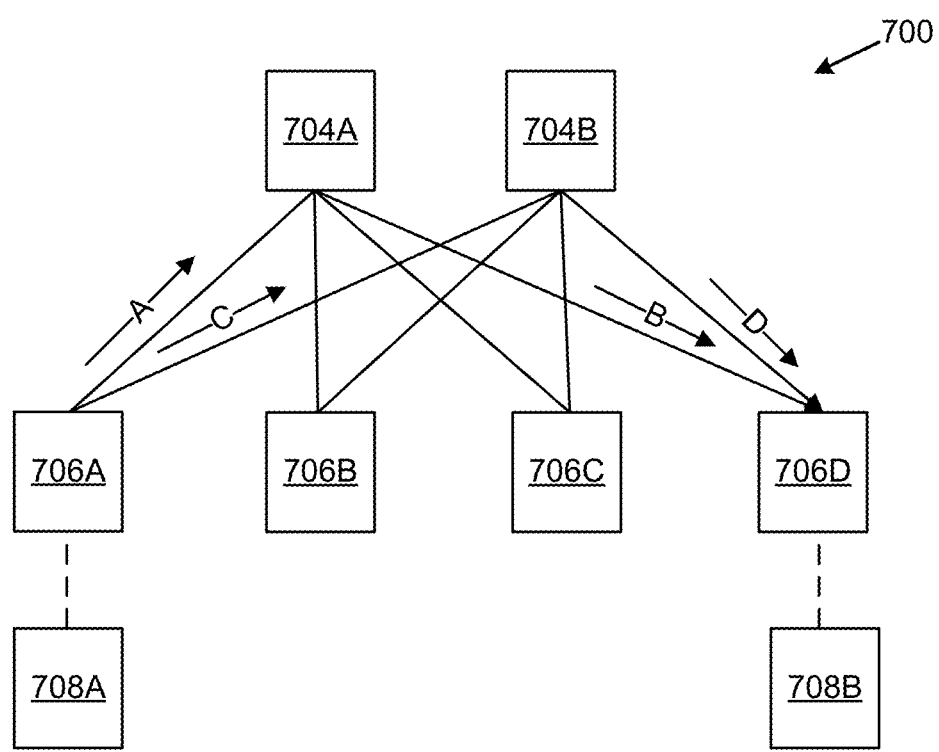
FIG. 7 is a schematic diagram illustrating a continuous verification method for an enhanced ECMP technique according to an embodiment of the disclosure.

FIG. 7 is a schematic diagram of a leaf-spine topology 700 that may be used with a metrofinder technique for traffic flow path selection according to an embodiment of the disclosure. Leaf-spine topology 700 may implement the leaf-spine structure of CO 212 and backbone spine 210 in metro underlay network 102 of FIG. 2. In an embodiment, an enhanced ECMP technique may be configured to determine an optimal path and time period selection through metro underlay network 202.

Leaf-spine topology 700 may include spine switches 704A and 704B, and leaf switches 706A, 706B, 706C, and 706D. Each leaf switch 706A-706D may be at the edge of the metro underlay network 202 and connects directly via a link to nodes 708A-708B. Each leaf switch 706A-706D is connected to every spine switch 704A-704B in a bipartite graph. Using the bipartite graph links, routed network traffic only traverses one hop from spine switch 704A-704B to another leaf switch 706A-706D in order to reach a destination node 708A or 708B. As such, the spine switches 704A-704B may be considered to be the intermediate switches in the metro underlay network 202. Nodes 708A and 708B are connected to the leaf switches 706A-706B by links. In an example, node 708A may be connected to the leaf switch 706A, and node 708B may be connected to leaf switch 706D.

In an example, data packets for a first example data flow may originate at node 708A and traverse path A-B from leaf switch 706A, through spine switch 704A, and to a destination node at leaf switch 706D. In another example, data packets for a second example data flow may originate at node 708A and traverse path C-D from leaf switch 706A, through spine switch 704B, and to a destination node at leaf switch 706D. As the distance of each path A-B or path C-D in the leaf-spine topology 700 may be in the tens of miles, for example, may be 50 miles or greater, data packets that are transmitted using any of the paths A-B or C-D may have to consider latency of the paths where near real-time transmission of data packets from a source node to a destination node may be needed. For instance, data packets generated by real-time voice applications or content streaming applications may have to be transmitted in near real-time while data packets of IOT applications or analytics applications may need not consider latency of the paths. As such, leaf-spine topology 700 may have to consider application types, application location, network congestion, and data volume when data packets are transmitted or forwarded through metro underlay network 202.

In an embodiment, each leaf switch 706A-706D may be configured to transmit a probe packet to another leaf switch 706A-706D. The probe packet may be an L3 data packet that may be used to determine a network status of each link and each path in the leaf-spine topology 700. In an embodiment, each leaf switch 706A-706D may transmit probe packets using each spine switch 704A-704B and using each path to a destination leaf switch 706A-706D. For instance, an originating leaf switch 706A may transmit a first probe packet to a destination leaf switch 706D using path A-B. The originating leaf switch 706A may also transmit a second probe packet to the destination leaf switch 706D using path C-D. Probe packets may be repeatedly transmitted from an originating leaf switch 706A-706D to a destination leaf switch 706A-706D to detect a change in the network status over time. In an embodiment, each originating leaf switch 706A-706D may also determine a network status for paths to other nodes in the metro underlay network 102 including paths from the originating leaf switch 706A-706D to the metro datacenters 206, 208 of the metro underlay network 202.

The originating leaf switch 706A may monitor the RTT between transmitting a probe packet across each path A-B and C-D and receiving a response packet from each destination leaf switch. The response packet may be sent by a destination node using the same path that was originally used to send the probe packet. The response packet may provide information as to the time that the destination node received the probe packet. Using the response packet, the originating leaf switch 706A may determine a total path delay for each path to the destination leaf switch 706D. Similarly, total path delay for other paths, for example, total path delay between an originating leaf switch comprising any leaf switch 706A-706D and a destination leaf switch comprising any leaf switch 706A-706D, may be obtained using similar probe packets. The total path delay may represent a network status for links and paths in the metro underlay network 202. As some links between the originating leaf switch 706A and the destination leaf switch 706D may be broken, the originating leaf switch 706A may also identify the broken link by monitoring whether a response packet from the destination leaf switch 706D has been received within a predetermined or predefined threshold time. In some examples, a predefined threshold time may be set at 1 milliseconds (ms), 10 ms, or 100 ms. If a RTT message has not been received within the predetermined threshold time, the originating leaf switch 706A may define the link as a broken link.

The total path delay, as shown in Table 8, may be a sum of the path delay, as shown in Table 6, and link delay, as shown in Table 7. The total path delay may be determined using the RTT of the probe packet. Path delay may be the delay encountered by a packet between the time of insertion into the leaf-spine topology 700 at an originating leaf switch 706A-706D and the time of delivery to a destination leaf switch 706A-706D. Link delay may be the delay encountered by a packet in a link between an originating leaf switch 706A-706D and a spine switch 704A-704B when inserted into leaf-spine topology 700. Total path delay for a network traffic path from an originating leaf switch 706A-706D to a destination leaf switch 706A-706D may be stored in a routing table at the originating leaf switch.

TABLE 6

| Path | Queue Delay (us) |
| --- | --- |
| Destination 1, Path 1 | 100 |
| Destination 1, Path 2 | 500 |
| . . . | . . . |

TABLE 7

| Link | Link Delay (us) |
| --- | --- |
| Path 1 Link 1 | 500 |
| Path 1 Link 2 | 1000 |
| Path 2 Link 1 | 300 |
| Path 2 Link 2 | 800 |
| . . . | . . . |

TABLE 8

| Total Path | Total Path Delay (us) |
| --- | --- |
| Destination 1, Path 1 | 600 |
| Destination 1, Path 2 | 1500 |
| . . . | . . . |

Figure 8:
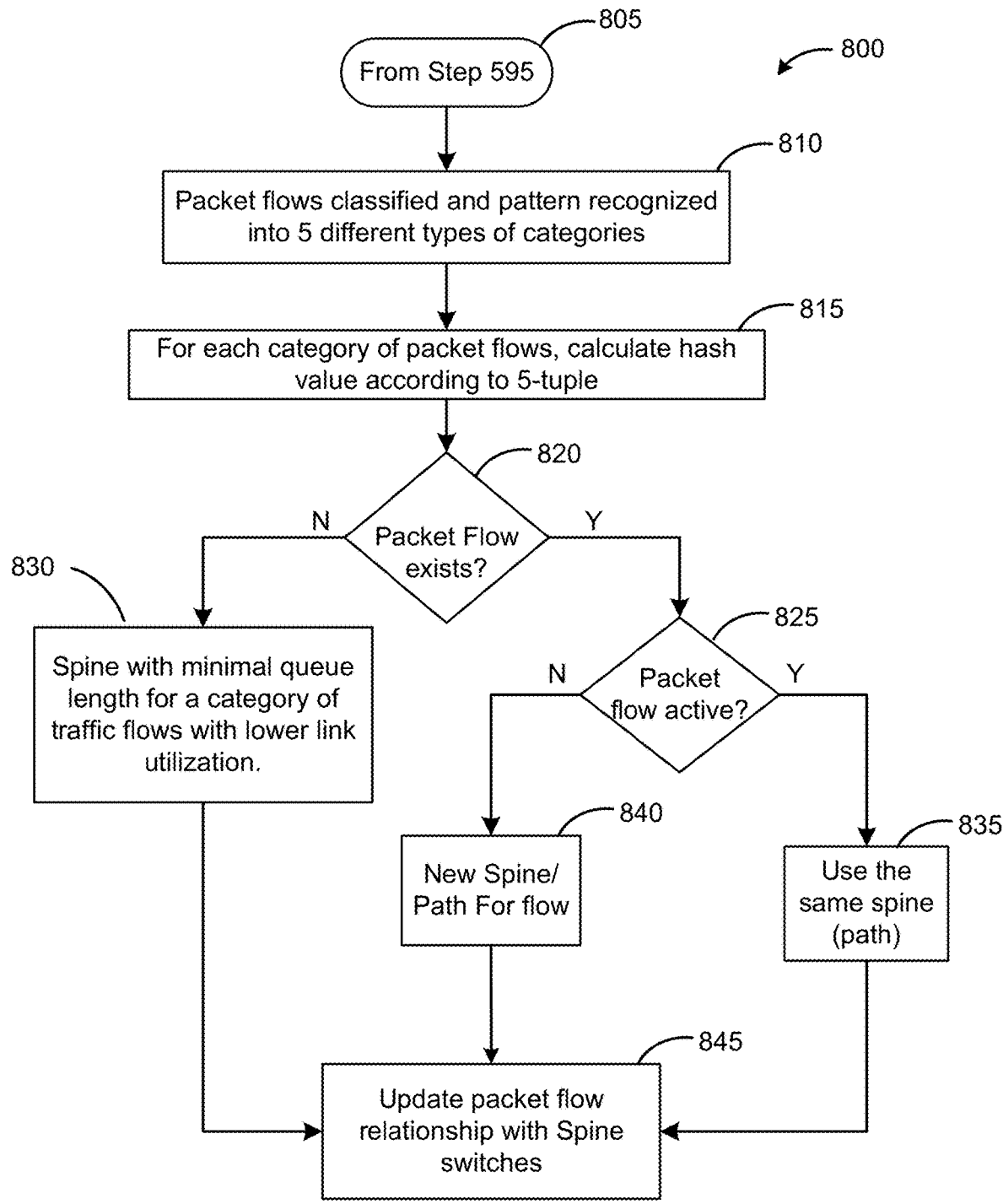
FIG. 8 is a flowchart illustrating a method for a metrofinder technique for an enhanced ECMP method according to an embodiment of the disclosure.

FIG. 8 is a flowchart illustrating a method 800 for a metrofinder technique that may leverage an enhanced ECMP method according to an embodiment of the disclosure. A network adapter at a leaf switch in any metro leaf node 404A-404C (FIG. 4) may implement the method 800 on packet data flow 602.

Method 800 may begin at step 805 and proceeds to step 810. At step 810, data packets for packet data flow 602 that are received at a leaf switch may be classified and recognized into five (5) different flow categories in a flow category lookup table. For instance, flow categories may be classified according to the flow categories provided in Table 1.

At step 815, network adapter may calculate/obtain a hash value of a 5-tuple label of a data packet for packet data flow 602. For instance, network adapter may use a hash function to calculate a hash value of a 5-tuple label of header fields of data packets for each flow category of packet data flow 602 and obtain a flow ID of the data packets. The 5-tuple labels may include a source IP address, a destination IP address, a source port, a destination port, and a transport protocol.

At step 820, the network adapter determines whether the flow ID j for the data packets matches a flow ID in a flow table. For instance, the network adapter may determine whether a flow ID j in a flow table matches the hash value of the 5-tuple label of data packet of packet data flow 602.

At step 820, if a flow ID j does not match the hash value of the 5-tuple label, the flow ID for the data packets does not exist in the flow table (Step 820="N"), then step 820 proceeds to step 830.

At step 830, network adapter may use Tables 3-5 to select a spine switch for transmitting data packets to a spine switch. For instance, network adapter may use spine switch queue length and link utilization percentage of a link between a leaf switch and a spine switch in order to select a spine switch. In an embodiment, network adapter may select a spine switch with a minimal queue length (for example, 500 us) from Table 3 and lower link utilization (for example, 20%) from Table 4. In an embodiment, network adapters at each spine switch may be weighted so that higher weighted network adapters may be selected to receive data packets from leaf switches so as to influence selection of spine switches/paths and perform load balancing of packet data flows.

However, at step 820, if flow ID j in the flow table matches the hash value of a 5-tuple label of a data packet for packet data flow 602, the flow ID for the data packet is associated with a flow category in the flow table (Step 820="Y"), and step 820 proceeds to step 825.

At step 825, network adapter may determine whether a packet data flow is active for a predetermined threshold time period. For instance, the network adapter may determine whether the leaf switch has been transmitting data packets to a spine switch of metro spine node 406A-406C and has not been idle for a time period ("idle time period") that is greater than a threshold time period. If the packet data flow time period is active (for example, idle time period lesser than the threshold time period), then step 825 proceeds to step 835.

In an embodiment, the threshold time period may be 10 ms. Other threshold time periods may be predefined or predetermined by the network adapter.

At step 835, network adapter may transmit data packets to the same spine switch that was previously used for the data flow. For instance, network adapter may consider packet data flow an existing data flow and may use a same spine switch that was previously used for the data flow transmission.

At step 845, the flow table may be updated with information on a spine switch that was used for transmitting the packet data flow. For instance, network adapter may update the flow table to assign a flow ID of the data flow corresponding to a specific flow category to the spine switch that was used to transmit the data flow.

At step 825, if the data flow time period is inactive (for example, data flow transmission has been idle for greater than the threshold time period), then step 825 proceeds to step 840. At step 840, network adapter may select another new spine switch from the spine switches in metro spine node 406A-406C based on spine switch queue length and link utilization.

At step 845, network adapter may store the current relationship for transmitting a packet data flow with flow ID j and network port i between a leaf switch at metro leaf node 404A-404C and a particular spine switch at metro spine node 406A-406C. J represents a hash value of the 5-tuple label.

Referring back to FIG. 4, a metroburst buffer management technique may be implemented by a spine switch of metro spine node 406A-406C according to an embodiment of the invention. Metroburst buffer management technique may be configured for buffer queue mitigation during microburst data transmission of data flow traffic from a leaf switch of metro leaf node 404A-404C. As used herein, a microburst transmission may be a data flow that arrives in small bursts at a spine switch and may lead to periods of full line-rate transmission that can overflow packet buffers in a spine switch. The microburst transmission may occur when accommodating multiple simultaneous mice flows at the same spine switch output port. One solution to handle microburst issues may be to increase a buffer size in spine switch 406A-406C. However, increasing buffer sizes at a spine switch may cause a bufferbloat, whereby increased buffer sizes may incur high latency and latency variation. The metroburst buffer management technique may mitigate microburst issues while using minimal buffer sizes.

The metroburst buffer management technique may be implemented using an intelligent module to periodically measure a queue length, queue latency, flow input rate, flow output rate, flow packet loss ratio, and their rates of change for a buffer queue according to a flow category. The metro spine node 406A-406C may automatically adjust its buffer parameters such as packet drop probability, buffer size, buffer thresholds, according to the congestion in the links and paths to a destination metro leaf node 404A-404C, as will be shown and described in FIG. 9. The metroburst module may continuously monitor system states of a buffer queue including each queue's average length, each flow input rate, output rate, the total number of flows in the queue, or similar parameters. Based on the observation during each interval (for example, an interval within a range of 1 milliseconds-100 milliseconds), the metroburst module may increase or decrease a drop probability of packets belonging to a specific flow category, or increase a buffer size in order to absorb bursty flows for a specific category of flow. For instance, the metroburst module may increase a buffer size for a mice flow. The metroburst module may maximize the rewards/utilities defined by each category of traffic flows. For instance, a mice flows may have a utility as 1/average queue latency. A user may predefine target values such as average latency and average packet loss ratio (PLR) for the metroburst module to achieve during an optimization process. The metroburst module may continuously infer proper actions to auto-adjust buffer parameters (for example, queue thresholds for packet drop or dynamic buffer allocation) from policy and achieve optimal utilities. The benefits of buffer management may maximize a widely-used utility function by jointly learning spine switch buffer states and its dynamics, and making decisions under the guidance of machine learning.

Figure 9:
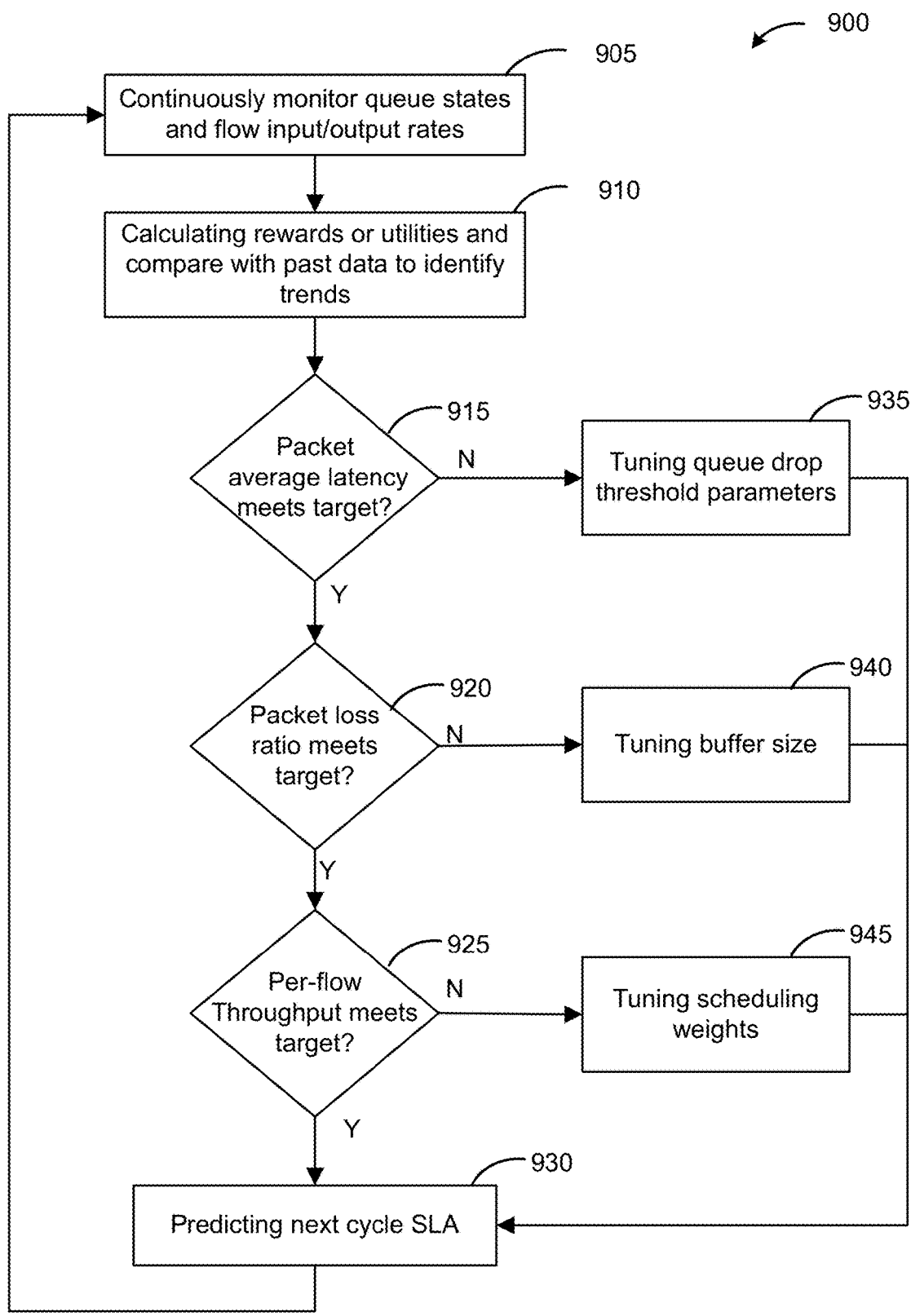
FIG. 9 is a flowchart illustrating a method for implementing a metroburst buffer management technique according to an embodiment of the disclosure.

FIG. 9 is a flowchart illustrating a method 900 for implementing a proactive buffer management technique according to an embodiment of the disclosure. A network adapter at metro spine node 406A-406C (FIG. 4) may include a metroburst module that implements method 900 on packet data flow traffic received by metro spine node 406A-406C.

At step 905, network adapter may continuously monitor a queue state of a buffer and flow rates of packet data flows entering or leaving buffer queue. A buffer queue may be allocated to different data flows according to CBQ. Each buffer queue for a flow category may be shared with data flows coming from different leaf switches. Packet data flows for a flow category may be received from multiple leaf switches at a spine switch and stored in a buffer allocated for the flow category. Network adapter may also monitor input rate of data packets entering a buffer queue, output rates of data packets leaving the buffer queue, a length of a buffer queue, and a size of the buffer queue.

At step 910, network adapter may predict a next cycle of packet data flows to be received by a buffer queue associated with a flow category. For instance, based on the queue monitoring results in step 905 that are received by a metro spine, network adapter may calculate rewards or utilities for the current queue state.

At step 915, network adapter may determine average packet latency for a buffer. For instance network adapter may obtain an average packet latency of an average of data packets that are received by a buffer queue. In an embodiment, average packet latency may be determined by RTT. In another embodiment, average packet latency may be determined by one way time to receive a data packet. If the average packet latency is less than a target latency threshold (step 915="Y"), the step 915 proceeds to step 920. However, if the average packet latency is greater than a target latency threshold, (step 915="N"), then step 915 proceeds to step 935. At step 935, network adapter may tune queue drop threshold parameters. For instance, network adapter may adjust a packet drop probability according to the congestion in the links and paths to a destination metro leaf node 404A-404C.

At step 920, network adapter may determine whether packet loss ratio for a buffer is less than a target packet loss ratio threshold. A packet loss ratio may be defined as the number of dropped packets over total packets received (e.g., 0.01%). If the packet loss ratio is less than a target packet loss ratio threshold (step 920="Y"), the step 920 proceeds to step 925. However, if the packet loss ratio is greater than a target packet loss ratio threshold, (step 920="N"), then step 920 proceeds to step 940. At step 940, network adapter may tune buffer queue parameters. For instance, network adapter may adjust a buffer queue parameter to a larger buffer size according to the congestion in a link and path to a destination metro leaf node 404A-404C.

At step 925, network adapter may determine whether per-flow throughput is greater than a target per-flow throughput threshold. Per-flow throughput (Mb/s) may be used to obtain or define a bandwidth for a packet data flow within a shared link If the per-flow throughput is greater than a target per-flow throughput threshold (step 925="Y"), the step 925 proceeds to step 930. However, if the per-flow throughput is lesser than a target per-flow throughput threshold, (step 925="N"), then step 925 proceeds to step 945. At step 945, network adapter may tune scheduling weights of packet data flows to increase throughput of high priority packet data flows and reduce throughput of low priority packet data flow according to the congestion in the links and paths to a destination metro leaf node 404A-404C.

At step 930, network adapter may predict next cycle SLA for a given time period. In an embodiment, network adapter may generate QoS requirements such as queuing latency, packet loss and throughput for traffic flows.

Figure 10:
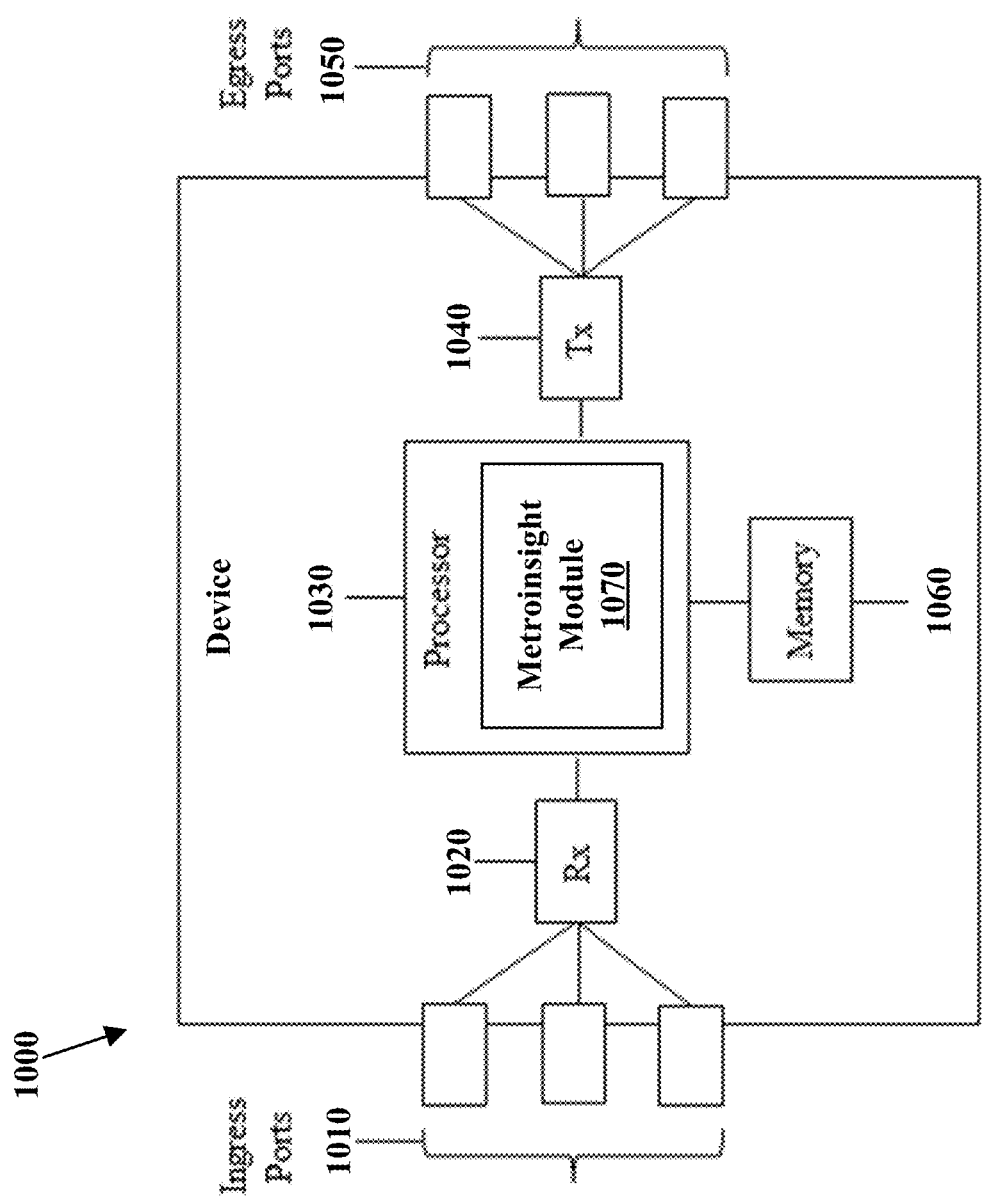
FIG. 10 is a schematic diagram of an apparatus according to an embodiment of the disclosure.

FIG. 10 is a schematic diagram of an apparatus 1000 according to an embodiment of the disclosure. The apparatus 1000 may implement the disclosed embodiments. Apparatus 1000 comprises ingress ports 1010 and an RX 1020 for receiving data; a processor, logic unit, baseband unit, or CPU 1030 to process the data; a TX 1040 and egress ports 1050 for transmitting the data; and a memory 1060 for storing the data. Apparatus 1000 may also comprise OE components, EO components, or RF components coupled to the ports 1010, RX 1020, TX 1040, and egress ports 1050 for ingress or egress of optical, electrical signals, or RF signals.

Processor 1030 is any combination of hardware, middleware, firmware, or software. Processor 1030 comprises any combination of one or more CPU chips, cores, FPGAs, ASICs, or DSPs. Processor 1030 communicates with ingress ports 1010, RX 1020, TX 1040, egress ports 1050, and memory 1060. Processor 1030 comprises metroinsight module 1070, which implements the disclosed embodiments. The inclusion of the metroinsight module 1070 therefore provides a substantial improvement to the functionality of the apparatus 1000 and effects a transformation of apparatus 1000 to a different state. Alternatively, memory 1060 stores the metroinsight module 1070 as instructions, and processor 1030 executes those instructions.

Memory 1060 comprises any combination of disks, tape drives, or solid-state drives. Apparatus 1000 may use memory 1060 as an over-flow data storage device to store programs when apparatus 1000 selects those programs for execution and to store instructions and data that the apparatus 1000 reads during execution of those programs. Memory 1060 may be volatile or non-volatile and may be any combination of ROM, RAM, TCAM, or SRAM.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network adapter for a metro network, comprising:
a receiver configured to receive a data packet of a packet data flow at an ingress port;
a memory comprising instructions;
a processor coupled to the memory and the receiver, the instructions causing the network adapter to be configured to:
determine whether a hash value of a 5-tuple label of header fields in the data packet matches a flow identifier (ID) in a flow table; and
obtain a flow category of the data packet from the flow table when the hash value of the 5-tuple label of header fields in the data packet and the flow ID match and obtain the flow category from an artificial intelligence (AI)-based flow classifier after having added an unknown flow category to the flow table and having assigned a priority to the data packet flow when the hash value of the 5-tuple label of header fields in the data packet and the flow ID are mismatched; and
a transmitter coupled to the processor and configured to transmit the data packet to a spine switch of a plurality of spine switches using the flow category.

2. The network adapter of claim 1, wherein the instructions further cause the network adapter to be configured to determine whether the packet data flow is active for a predetermined threshold time period, and the transmitter being configured to transmit additional data packets associated with the packet data flow to the spine switch responsive to the packet data flow being active for the predetermined threshold time period.

3. The network adapter of claim 1, wherein the instructions further cause the network adapter to be configured to obtain at least one of a spine switch queue length or a spine switch link utilization between the network adapter and a second spine switch, and the transmitter being configured to transmit the data packet to the second spine switch responsive to the hash value of the data packet not matching the flow ID in the flow table.

4. The network adapter of claim 3, wherein the instructions further cause the network adapter to be configured to determine a third spine switch according to a minimum of a queue length and link utilization of the third spine switch, and the transmitter being configured to transmit the data packet to the third spine switch responsive to the hash value of the data packet not matching the flow ID in the flow table.

5. The network adapter of claim 4, wherein the spine switch queue length comprises a queue delay in a buffer of the spine switch.

6. The network adapter of claim 1, wherein the instructions further cause the network adapter to be configured to determine a weighted value of each network element associated with the spine switch, and the transmitter being configured to transmit the data packet to a destination node according to the weighted value of each network element.

7. The network adapter of claim 1, wherein the instructions further cause the network adapter to be configured to assign the flow ID to the spine switch, the flow ID corresponding to the flow category of the data packet.

8. A method implemented in a metro network, comprising:
- receiving, at a network adapter, a data packet of a packet data flow at an ingress port;
- determining, by the network adapter, whether a hash value of a 5-tuple label of header fields in the data packet matches a flow identifier (ID) in a flow table;
- obtaining, by the network adapter, a flow category of the data packet from the flow table when the hash value of the 5-tuple label of header fields in the data packet and the flow ID match and obtain the flow category from an artificial intelligence (AI)-based flow classifier after having added an unknown flow category to the flow table and having assigned a priority to the data packet flow when the hash value of the 5-tuple label of the header fields in the data packet and the flow ID are mismatched; and
- transmitting, by the network adapter, the data packet to a spine switch of a plurality of spine switches using the flow category to permit the spine switch to route the data packet to a destination using network status and subsequent routing paths.

9. The method of claim 8, further comprising:
- determining whether the packet data flow is active for a predetermined threshold time period; and
- transmitting additional data packets associated with the packet data flow to the spine switch in response to the determined packet data flow being active for the predetermined threshold time period.

10. The method of claim 8, further comprising:
- obtaining at least one of a spine switch queue length and spine switch link utilization between the network adapter and a second spine switch; and
- transmitting the data packet to the second spine switch responsive to the hash value of the data packet not matching the flow ID in the flow table.

11. The method of claim 10, further comprising:
- selecting a third spine switch according to a minimum of a queue length and link utilization of the third spine switch; and
- transmitting the data packet to the third spine switch responsive to the hash value of the data packet not matching the flow ID in the flow table.

12. The method of claim 11, wherein the queue length comprises queue delay in a buffer of the spine switch.

13. The method of claim 8, further comprising:
- determining a weighted value of each network element associated with the spine switch; and
- transmitting the data packet to a destination node according to the weighted value of each network element.

14. The method of claim 8, further comprising assigning the flow ID of the data packet to the spine switch, the flow ID corresponding to the flow category of the data packet.

15. A system in a network, the system comprising:
- a plurality of compute servers, each compute server of the compute servers being configured as either a source node or a destination node;
- a plurality of spine switches; and
- at least one leaf switch coupled to a compute server of the plurality of compute servers and to each spine switch of the plurality of spine switches, the at least one leaf switch including a memory comprising instructions and a processor coupled to the memory, the instructions causing the at least one leaf switch to be configured to:
  - determine whether a hash value of a 5-tuple label of header fields in the data packet matches a flow identifier (ID) in a flow table;
  - obtain a flow category of the data packet from the flow table when the hash value of the 5-tuple label of header fields in the data packet and the flow ID match and obtain the flow category from an artificial intelligence (AI)-based flow classifier after having added an unknown flow category to the flow table and having assigned a priority to the data packet flow when the hash value of the 5-tuple label of the header fields in the data packet and the flow ID are mismatched; and
- a transmitter coupled to the processor and configured to transmit the data packet to a spine switch of the plurality of spine switches using the flow category.

16. The system of claim 15, wherein the instructions further cause the at least one leaf switch to be configured to determine whether a packet data flow is active for a predetermined threshold time period, and the transmitter being configured to transmit additional data packets associated with the packet data flow to the spine switch in response to the packet data flow being active for the predetermined threshold time period.

17. The system of claim 15, wherein the instructions further cause the at least one leaf switch to be configured to obtain at least one of a queue length or link utilization between the at least one leaf switch and a second spine switch, and the transmitter being configured to transmit the data packet to the second spine switch responsive to the determined hash value of the data packet not matching the flow ID in the flow table.

18. The system of claim 17, wherein the instructions further cause the at least one leaf switch to be configured to select a third spine switch according to a minimum queue length and a link utilization between the at least one leaf switch and the third spine switch, and the transmitter being configured to transmit the data packet to the third spine switch in response to the determined hash value of the data packet not matching the flow ID in the flow table.

19. The system of claim 15, wherein the instructions further cause the at least one leaf switch to be configured to determine a weighted value of each network element associated with the spine switch, and the transmitter being configured to transmit the data packet toward a destination node according to the weighted value of each network element.

20. The system of claim 15, wherein the instructions further cause the at least one leaf switch to be configured to assign the flow ID of the data packet to the spine switch, the flow ID corresponding to the flow category of the data packet.

* * * * *